(12) United States Patent
Brennan et al.

(10) Patent No.: US 10,603,848 B2
(45) Date of Patent: Mar. 31, 2020

(54) APPARATUS FOR LAYUP PLACEMENT

(71) Applicant: The Boeing Company, Chicago, IL (US)

(72) Inventors: Joseph D. Brennan, Shoreline, WA (US); George D. Hempstead, Camano Island, WA (US); Darrell D. Jones, Mill Creek, WA (US); Matthew K. Lum, Mercer Island, WA (US); Peter D. McCowin, Enumclaw, WA (US); Terrence J. Rowe, Seattle, WA (US); Hugh R. Schlosstein, Renton, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/683,769

(22) Filed: Aug. 22, 2017

(65) Prior Publication Data

US 2017/0368766 A1 Dec. 28, 2017

Related U.S. Application Data

(62) Division of application No. 11/751,928, filed on May 22, 2007, now Pat. No. 9,770,871.

(51) Int. Cl.
*B29C 70/30* (2006.01)
*B29C 70/32* (2006.01)
(Continued)

(52) U.S. Cl.
CPC ............ *B29C 70/30* (2013.01); *B29C 70/32* (2013.01); *B29C 70/541* (2013.01);
(Continued)

(58) Field of Classification Search
CPC . B23P 19/047; B23P 2700/50; B23P 2700/14; F01D 25/28; F01D 25/285;
(Continued)

(56) References Cited

U.S. PATENT DOCUMENTS 2,374,894 A 5/1945 Pioch et al.
2,679,278 A 5/1954 Clark
(Continued)

FOREIGN PATENT DOCUMENTS

DE 102004046520 A1 4/2005
EP 0230682 A2 8/1987
(Continued)

OTHER PUBLICATIONS

Notice of Allowance dated Jun. 17, 2014, regarding U.S. Appl. No. 11/952,222, 15 pages.
(Continued)

*Primary Examiner* — Christopher J Besler
(74) *Attorney, Agent, or Firm* — Yee & Associates, P.C.

(57) ABSTRACT

Method and apparatus for layup placement on a layup structure is provided. The method includes iteratively loading a layup for the layup structure on a support frame of a saddle module; aligning the saddle module with a pre-selected registration position corresponding to a predetermined application path on the layup structure; and impressing the layup into forced contact with the layup structure along the predetermined application path using a predetermined application force. The apparatus includes a plurality of saddle modules configured to operate in unison, wherein the plurality of saddle modules is configured to receive a pre-selected composite material layup.

20 Claims, 11 Drawing Sheets

(51) Int. Cl.
  *B29C 70/54* (2006.01)
  *F01D 25/28* (2006.01)
  *B29C 70/38* (2006.01)
  *B29L 31/30* (2006.01)

(52) U.S. Cl.
  CPC ..... *B29C 70/386* (2013.01); *B29L 2031/3076* (2013.01); *F01D 25/285* (2013.01); *Y10T 29/49622* (2015.01); *Y10T 29/53* (2015.01)

(58) Field of Classification Search
  CPC ....... B29C 70/30; B29C 70/32; B29C 70/541; B29C 70/38; B29C 70/386; B29C 66/345; B29C 2043/142; B29C 66/8341
  See application file for complete search history.

(56) References Cited

U.S. PATENT DOCUMENTS

| | | |
|---|---|---|
| 3,101,290 A | 8/1963 | Frederic et al. |
| 3,377,096 A | 4/1968 | Wood |
| 3,739,166 A | 6/1973 | Anderson |
| 3,885,071 A | 5/1975 | Blad et al. |
| 3,967,996 A | 7/1976 | Kamov et al. |
| 3,983,282 A | 9/1976 | Seemann, III |
| 4,015,035 A | 3/1977 | Blad et al. |
| 4,016,022 A | 4/1977 | Browning et al. |
| 4,049,484 A | 9/1977 | Priest et al. |
| 4,120,632 A | 10/1978 | Stoeberl |
| 4,132,755 A | 1/1979 | Johnson |
| 4,208,238 A | 6/1980 | August et al. |
| 4,238,539 A | 12/1980 | Yates et al. |
| 4,287,015 A | 9/1981 | Danner, Jr. |
| 4,476,797 A | 10/1984 | Ianov et al. |
| 4,491,081 A | 1/1985 | Ianov |
| 4,491,493 A | 1/1985 | Eaton |
| 4,496,412 A | 1/1985 | Ritter |
| 4,548,859 A | 10/1985 | Kline et al. |
| 4,554,036 A | 11/1985 | Newsom |
| 4,564,543 A | 1/1986 | Ritter |
| 4,588,626 A | 5/1986 | Cologna et al. |
| 4,622,091 A | 11/1986 | Letterman |
| 4,698,115 A | 10/1987 | Dodds |
| 4,741,943 A | 5/1988 | Hunt |
| 4,824,513 A | 4/1989 | Dodds |
| 4,875,962 A | 10/1989 | Breakspear |
| 4,902,215 A | 2/1990 | Seemann, III |
| 4,917,353 A | 4/1990 | Riley |
| 4,934,199 A | 6/1990 | Avila et al. |
| 4,942,013 A | 7/1990 | Palmer et al. |
| 4,945,488 A | 7/1990 | Carver et al. |
| 4,961,799 A | 10/1990 | Cologna et al. |
| 4,987,700 A | 1/1991 | Westerman et al. |
| 5,033,014 A | 7/1991 | Carver et al. |
| 5,034,254 A | 7/1991 | Cologna et al. |
| 5,052,906 A | 10/1991 | Seemann |
| 5,071,338 A | 12/1991 | Dublinski et al. |
| 5,087,193 A | 2/1992 | Herbert, Jr. |
| 5,116,216 A | 5/1992 | Cochran et al. |
| 5,123,985 A | 6/1992 | Evans et al. |
| 5,129,813 A | 7/1992 | Shepherd |
| 5,167,742 A | 12/1992 | Peters |
| 5,180,046 A | 1/1993 | Hutton et al. |
| 5,190,611 A | 3/1993 | Cologna et al. |
| 5,207,541 A | 5/1993 | Westerman et al. |
| 5,217,669 A | 6/1993 | Dubliniski et al. |
| 5,290,386 A | 3/1994 | Trudeau |
| 5,316,462 A | 5/1994 | Seemann |
| 5,350,614 A | 9/1994 | Chase et al. |
| 5,359,887 A | 11/1994 | Schwab et al. |
| 5,364,584 A | 11/1994 | Imanara et al. |
| 5,427,518 A | 6/1995 | Morizot et al. |
| 5,427,725 A | 6/1995 | White et al. |
| 5,429,326 A | 7/1995 | Garesche et al. |
| 5,439,635 A | 8/1995 | Seemann |
| 5,441,692 A | 8/1995 | Taricco |
| 5,514,232 A | 5/1996 | Burns |
| 5,576,030 A | 11/1996 | Hooper |
| 5,601,852 A | 2/1997 | Seemann |
| 5,612,492 A | 3/1997 | Schwab et al. |
| 5,667,881 A | 9/1997 | Rasmussen et al. |
| 5,683,646 A | 11/1997 | Reiling, Jr. |
| 5,702,663 A | 12/1997 | Seemann |
| 5,721,034 A | 2/1998 | Seemann, III et al. |
| 5,759,325 A | 6/1998 | Davis |
| 5,780,721 A | 7/1998 | Levens |
| 5,820,894 A | 10/1998 | Kreutzer |
| 5,879,489 A | 3/1999 | Burns et al. |
| 5,882,756 A | 3/1999 | Alston et al. |
| 5,904,972 A | 5/1999 | Tunis, III et al. |
| 5,932,256 A | 8/1999 | Mandish |
| 5,939,013 A | 8/1999 | Han et al. |
| 5,954,898 A | 9/1999 | McKague et al. |
| 5,958,325 A | 9/1999 | Seemann, III et al. |
| 6,090,335 A | 7/2000 | McClure et al. |
| 6,093,572 A | 7/2000 | Stenholm et al. |
| 6,096,164 A | 8/2000 | Benson et al. |
| 6,206,067 B1 | 3/2001 | Kociemba et al. |
| 6,211,497 B1 | 4/2001 | Matsen et al. |
| 6,284,089 B1 | 9/2001 | Anderson et al. |
| 6,298,896 B1 | 10/2001 | Serrill et al. |
| 6,299,819 B1 | 10/2001 | Han |
| 6,325,974 B1 | 12/2001 | Ahvenainen et al. |
| 6,355,203 B1 | 3/2002 | Charmes et al. |
| 6,391,246 B2 | 5/2002 | Shiraishi et al. |
| 6,391,436 B1 | 5/2002 | Xu et al. |
| 6,406,659 B1 | 6/2002 | Lang et al. |
| 6,408,517 B1 | 6/2002 | Lehmker et al. |
| 6,435,242 B1 | 8/2002 | Reis |
| 6,461,551 B1 | 10/2002 | Mandish |
| 6,510,977 B1 | 1/2003 | Hertz |
| 6,533,985 B1 | 3/2003 | Smith |
| 6,551,091 B1 | 4/2003 | Bryant et al. |
| 6,575,218 B1 | 6/2003 | Burns et al. |
| 6,579,418 B2 | 6/2003 | Lindsay et al. |
| 6,589,472 B1 | 7/2003 | Benson et al. |
| 6,638,466 B1 | 10/2003 | Abbott |
| 6,689,438 B2 | 2/2004 | Kennedy et al. |
| 6,692,681 B1 | 2/2004 | Lunde |
| 6,696,690 B2 | 2/2004 | Benne |
| 6,761,783 B2 | 7/2004 | Keller et al. |
| 6,797,390 B2 | 9/2004 | Asai et al. |
| 6,808,143 B2 | 10/2004 | Munk et al. |
| 6,830,079 B1 | 12/2004 | Ahrens et al. |
| 6,860,957 B2 | 3/2005 | Sana et al. |
| 6,871,684 B2 | 3/2005 | Englebart et al. |
| 6,919,039 B2 | 7/2005 | Lang et al. |
| 7,013,943 B2 | 3/2006 | Sana et al. |
| 7,029,267 B2 | 4/2006 | Caron |
| 7,127,950 B2 | 10/2006 | Fonov et al. |
| 7,137,182 B2 | 11/2006 | Nelson |
| 7,141,191 B2 | 11/2006 | Engwall et al. |
| 7,186,367 B2 | 3/2007 | Hou et al. |
| 7,228,611 B2 | 6/2007 | Anderson et al. |
| 7,294,220 B2 | 11/2007 | Anderson |
| 7,306,450 B2 | 12/2007 | Hanson |
| 7,398,586 B2 | 7/2008 | Prichard et al. |
| 7,398,698 B2 | 7/2008 | Griess et al. |
| 7,413,694 B2 | 8/2008 | Waldrop, III et al. |
| 7,503,368 B2 | 3/2009 | Chapman et al. |
| 7,521,105 B2 | 4/2009 | Bech et al. |
| 7,527,759 B2 | 5/2009 | Lee et al. |
| 7,534,615 B2 | 5/2009 | Havens |
| 7,622,066 B2 | 11/2009 | Brustad et al. |
| 7,624,488 B2 | 12/2009 | Lum et al. |
| 7,628,879 B2 | 12/2009 | Ackerman |
| 7,655,168 B2 | 2/2010 | Jones et al. |
| 7,731,817 B2 | 6/2010 | Hethcock et al. |
| 7,762,122 B2 | 7/2010 | Adavani et al. |
| 7,849,729 B2 | 12/2010 | Miller et al. |
| 7,871,040 B2 | 1/2011 | Lee et al. |
| 7,963,038 B2 | 6/2011 | Schmitz |
| 7,964,049 B2 | 6/2011 | Kapur et al. |
| 8,003,034 B2 | 8/2011 | Oldani et al. |
| 8,114,673 B2 | 2/2012 | Mills et al. |

(56) References Cited

U.S. PATENT DOCUMENTS

| | | | |
|---|---|---|---|
| 8,333,864 B2 | 12/2012 | Brennan et al. | |
| 8,409,396 B2 | 4/2013 | Bech et al. | |
| 8,438,909 B2 | 5/2013 | Miller et al. | |
| 8,505,361 B2 | 8/2013 | Miller et al. | |
| 8,613,301 B2 | 12/2013 | Bernnan et al. | |
| 8,707,766 B2 | 4/2014 | Harris et al. | |
| 8,721,829 B2 | 5/2014 | Jacobsen et al. | |
| 8,752,293 B2 | 6/2014 | Jones et al. | |
| 8,916,010 B2 | 12/2014 | Brennan et al. | |
| 8,936,965 B2 | 1/2015 | Rotter et al. | |
| 9,046,437 B2 | 6/2015 | Miller et al. | |
| 2003/0175511 A1 | 9/2003 | Asai et al. | |
| 2004/0026025 A1 | 2/2004 | Sana et al. | |
| 2004/0031567 A1 | 2/2004 | Engelbart et al. | |
| 2005/0036879 A1* | 2/2005 | Jhaveri | B25J 9/0084 414/751.1 |
| 2005/0112772 A1 | 5/2005 | Farone et al. | |
| 2005/0230055 A1 | 10/2005 | Sana et al. | |
| 2006/0118235 A1 | 6/2006 | Lum et al. | |
| 2006/0260751 A1 | 11/2006 | Lauder et al. | |
| 2007/0029527 A1 | 2/2007 | Mills et al. | |
| 2007/0102109 A1 | 5/2007 | Katrizky et al. | |
| 2007/0107189 A1 | 5/2007 | Prichard et al. | |
| 2007/0272582 A1 | 11/2007 | Lau | |
| 2007/0289246 A1 | 12/2007 | Schmitz | |
| 2008/0023015 A1 | 1/2008 | Arnold et al. | |
| 2008/0111024 A1 | 5/2008 | Lee et al. | |
| 2008/0148817 A1 | 6/2008 | Miller et al. | |
| 2008/0178996 A1 | 7/2008 | Tada et al. | |
| 2008/0240634 A1* | 10/2008 | Laal Riahi | B29C 53/562 384/300 |
| 2008/0308674 A1 | 12/2008 | Frantz et al. | |
| 2009/0120562 A1 | 5/2009 | Tsotsis et al. | |
| 2009/0145545 A1 | 6/2009 | Brennan et al. | |
| 2009/0148647 A1 | 6/2009 | Jones et al. | |
| 2009/0211698 A1 | 8/2009 | McCowin | |
| 2009/0223432 A1 | 9/2009 | Kodama et al. | |
| 2009/0273107 A1 | 11/2009 | Advani et al. | |
| 2009/0320292 A1 | 12/2009 | Brennan et al. | |
| 2010/0011580 A1 | 1/2010 | Brennan et al. | |
| 2010/0012260 A1 | 1/2010 | Brennan et al. | |
| 2010/0078126 A1 | 4/2010 | Brennan et al. | |
| 2010/0170326 A1 | 7/2010 | Miller et al. | |
| 2011/0079174 A1 | 4/2011 | Miller et al. | |
| 2011/0259086 A1 | 10/2011 | Harris et al. | |
| 2011/0259515 A1 | 10/2011 | Rotter et al. | |
| 2013/0011586 A1 | 1/2013 | Landry et al. | |
| 2013/0042978 A1 | 2/2013 | Brennan et al. | |
| 2013/0239875 A1 | 9/2013 | Miller et al. | |
| 2014/0199768 A1 | 7/2014 | Harris et al. | |

FOREIGN PATENT DOCUMENTS

| | | | |
|---|---|---|---|
| EP | 0271263 A2 | 6/1988 | |
| EP | 0319449 A2 | 6/1989 | |
| EP | 0348831 A2 | 1/1990 | |
| EP | 0391641 A2 | 10/1990 | |
| EP | 0391641 B1 | 8/1994 | |
| EP | 0629497 A2 | 12/1994 | |
| EP | 0816438 A2 | 1/1998 | |
| EP | 1038656 A1 | 9/2000 | |
| EP | 1780120 A2 | 5/2007 | |
| EP | 1995044 A2 | 11/2008 | |
| EP | 1995045 A2 | 11/2008 | |
| EP | 2067611 A1 | 6/2009 | |
| EP | 2383106 A1 | 11/2011 | |
| EP | 2383559 A1 | 11/2011 | |
| EP | 2444240 A1 | 4/2012 | |
| GB | 2478848 A | 9/2011 | |
| JP | 60252235 A | 12/1985 | |
| JP | 62259059 A | 11/1987 | |
| JP | H06242087 A | 9/1994 | |
| JP | H10219853 A | 8/1998 | |
| JP | 2002254429 A | 9/2002 | |
| JP | 2004309379 A | 11/2004 | |
| KR | 19970058260 | 11/1997 | |
| WO | WO9322127 A1 | 11/1993 | |
| WO | WO0176892 A1 | 10/2001 | |
| WO | WO02099416 A1 | 12/2002 | |
| WO | WO03021252 A1 | 3/2003 | |
| WO | WO2004031321 A1 | 4/2004 | |
| WO | WO2004057120 A2 | 7/2004 | |
| WO | WO2004078461 A1 | 9/2004 | |
| WO | WO2005056391 A2 | 6/2005 | |
| WO | WO2005059500 A1 | 6/2005 | |
| WO | WO2006110627 A1 | 10/2006 | |
| WO | WO2006118692 A1 | 11/2006 | |
| WO | WO2008054499 A2 | 5/2008 | |
| WO | WO2008088435 A1 | 7/2008 | |
| WO | WO2010025376 A1 | 3/2010 | |

OTHER PUBLICATIONS

Office Action dated May 17, 2010, regarding U.S. Appl. No. 12/200,882, 9 pages.

Final Office Action dated Oct. 26, 2010, regarding U.S. Appl. No. 12/200,882, 8 pages.

Office Action dated Mar. 21, 2013, regarding U.S. Appl. No. 12/200,882, 47 pages.

Final Office Action, dated Jul. 29, 2013, regarding U.S. Appl. No. 12/200,882, 10 pages.

Office Action, dated Nov. 14, 2016, regarding U.S. Appl. No. 14/231,745, 61 pages.

Notice of Allowance, dated Mar. 15, 2017, regarding U.S. Appl. No. 14/231,745, 12 pages.

Office Action dated Jul. 27, 2010, regarding U.S. Appl. No. 12/242,477, 13 pages.

Final Office Action dated Dec. 2, 2010, regarding U.S. Appl. No. 12/242,477, 15 pages.

Notice of Allowance, dated Jul. 5, 2012, regarding U.S. Appl. No. 12/242,477, 9 pages.

Office Action, dated Mar. 26, 2013, regarding U.S. Appl. No. 13/657,137, 41 pages.

Office Action, dated Apr. 26, 2012, regarding U.S. Appl. No. 12/764,202, 13 pages.

Final Office Action, dated Nov. 16, 2012, regarding U.S. Appl. No. 12/764,202, 31 pages.

Office Action, dated Apr. 1, 2013, regarding U.S. Appl. No. 12/764,202, 38 pages.

Final Office Action, dated Aug. 15, 2013, regarding U.S. Appl. No. 12/764,202, 16 pages.

Notice of Allowance, dated Dec. 6, 2013, regarding U.S. Appl. No. 12/764,202, 20 pages.

Office Action dated Nov. 14, 2011, regarding U.S. Appl. No. 12/768,007, 20 pages.

Final Office Action, dated May 3, 2012, regarding U.S. Appl. No. 12/768,007, 29 pages.

Office Action, dated May 22, 2014, regarding U.S. Appl. No. 12/768,007, 67 pages.

Notice of Allowance, dated Sep. 3, 2014, regarding U.S. Appl. No. 12/768,007, 8 pages.

Notice of Allowance, dated Jan. 26, 2015, regarding U.S. Appl. No. 13/892,916, 64 pages.

Notice of Allowance, dated Jul. 14, 2016, regarding U.S. Appl. No. 14/217,478, 13 pages.

Office Action, dated Jan. 12, 2016, regarding U.S. Appl. No. 14/217,478, 55 pages.

Office Action, dated Oct. 5, 2017, regarding U.S. Appl. No. 14/589,996, 104 pages.

Notice of Allowance, dated Feb. 26, 2018, regarding U.S. Appl. No. 14/589,996, 9 pages.

European Search Report dated Mar. 2, 2009 regarding Application No. EP08171011 (EP2067611), 2 pages.

European Search Report, dated Sep. 30, 2011, regarding Application No. EP11160843 (EP2383559), 7 pages.

European Search Report dated Sep. 15, 2011 regarding Application No. EP11160866 (EP2383106), 4 pages.

(56) References Cited

OTHER PUBLICATIONS

European Search Report dated Mar. 2, 2012 regarding Application No. EP12151305 (EP2444240), 2 pages.
European Patent Office Communication, dated Feb. 19, 2015, regarding Application No. EP12151305.5, 5 pages.
European Search Report dated Dec. 2, 2013 regarding Application No. EP09792061.5-1753, 6 pages.
Extended European Search Report, dated Sep. 11, 2015, regarding Application No. EP15167436.3, 7 pages.
UK Intellectual Property Office Search Report dated Jul. 15, 2011 regarding Application No. GB1104472.4 (GB2478848), 5 pages.
International Search Report dated May 29, 2008 regarding Application No. PCT/US2007/023455 (WO2008088435), 3 pages.
International Search Report dated Feb. 1, 2010 regarding Application No. PCT/US2009/055378 (WO2010025376), 3 pages.
Korean Intellectual Property Office Notice of Office Action dated Jun. 11, 2010, regarding Application No. 200847564, 9 pages.
Korean Intellectual Property Office Notice of Office Action dated Jun. 21, 2010, regarding Application No. 200847566, 14 pages.
State Intellectual Property Office of PRC Notification of Second Office Action and English Translation, dated Jun. 24, 2015, regarding Application No. 201110038342.9, 7 pages.
Canadian Intellectual Property Office Examination Search Report, dated May 20, 2015, regarding Application No. 2,735,435, 3 pages.
European Examination Report, dated Feb. 17, 2016, regarding Application No. 11160843.6, 8 pages.
Canadian Intellectual Property Office Examination Search Report, dated Mar. 13, 2017, regarding Application No. 2,735,435, 3 pages.
Buckingham et al., "Automating the manufacture of composite broadgoods," Composites Part A, vol. 27A, No. 3, Mar. 1996, pp. 191-200.
Campbell (Ed.), "Ply Collation: A Major Cost Driver," In: Manufacturing Processes for Advanced Composites, Elsevier Advanced Technology, Oxford, UK, pp. 131-173, 2004.
Campbell, "Adhesive Bonding and Integrally Cocured Structure," In: Manufacturing Processes for Advanced Composites, Elsevier Advanced Technology, Oxford, UK, Jan. 2004, pp. 242-245.
El Amin, "Nano ink indicates safety breach in food packaging," dated Nov. 14, 2006, 2 pages. Retrieved from http://www.foodproductiondaily.com/Quality-Safety/Nano-ink-indicates-safety-breach-in-food-packaging.
Jayaweera et al., "Adaptive robotic assembly of compliant aerostructure components," Robotics and Computer-Integrated Manufacturing, vol. 23, No. 2, Jan. 2007, pp. 180-194.
Lee et al., "Novel UV-Activated Colorimetric Oxygen Indicator," Chemistry of Materials, vol. 17, No. 10, May 2005, pp. 2744-2751.
Material Safety Data Sheet for Potassium indigotetrasulfonate, Sigma-Aldric Corporation, Dec. 13, 2012, 6 pages.
Mills et al., "UV-Activated Luminescence/Colourimetric O2 Indicator," International Journal of Photoenergy, vol. 2008, 2008, 6 pages.
Setnescu et al., "Polymer Films Doped with Colorants as Oxygen Sensitive Materials," Journal of Optoelectrics and Advanced Materials, vol. 8, No. 2, Apr. 2006, pp. 682-686.
Sieberg et al., "An advanced FRP manufacturing technique asserts itself: Practical experience with the vacuum Injection process," Studiedag Vakuuminjecteren, XP002169062, Oct. 27, 1998, pp. 13-19. (German-language article, English translation attached).
Office Action dated Apr. 13, 2011 regarding U.S. Appl. No. 11/751,928, 19 pages.
Final Office Action dated Jun. 23, 2011 regarding U.S. Appl. No. 11/751,928, 11 pages.
USPTO Office Action dated Jan. 19, 2012 regarding U.S. Appl. No. 11/751,928, 13 pages.
Final Office Action, dated Jun. 20, 2012, regarding U.S. Appl. No. 11/751,928, 20 pages.
Office Action, dated Sep. 8, 2016, regarding U.S. Appl. No. 11/751,928, 36 pages.
Notice of Allowance, dated Jan. 25, 2017, regarding U.S. Appl. No. 11/751,928, 18 pages.
Office Action dated Mar. 10, 2010 regarding U.S. Appl. No. 11/829,900, 10 pages.
Notice of Allowance dated Jul. 30, 2010 regarding U.S. Appl. No. 11/829,900, 8 pages.
Notice of Allowance, dated Sep. 21, 2012, regarding U.S. Appl. No. 12/725,380, 19 pages.
Office Action dated Feb. 21, 2012 regarding U.S. Appl. No. 12/906,489, 15 pages.
Notice of Allowance, dated Jun. 13, 2012, regarding U.S. Appl. No. 12/906,489, 9 pages.
Notice of Allowance, dated Sep. 14, 2012, regarding U.S. Appl. No. 12/906,489, 34 pages.
Office Action, dated Jun. 2, 2010 regarding U.S. Appl. No. 11/751,931, 15 pages.
Final Office Action, dated Aug. 11, 2010, regarding U.S. Appl. No. 11/751,931, 29 pages.
Office Action, dated May 20, 2011, USPTO regarding U.S. Appl. No. 11/751,931, 31 pages.
Final Office Action dated Sep. 28, 2011, regarding U.S. Appl. No. 11/751,931, 24 pages.
Notice of Allowance, dated May 10, 2013, regarding U.S. Appl. No. 11/751,931, 49 pages.
Office Action dated Oct. 26, 2010, regarding U.S. Appl. No. 11/952,222, 20 pages.
Final Office Action dated Apr. 15, 2011 regarding U.S. Appl. No. 11/952,222, 20 pages.
Office Action dated Oct. 3, 2011, regarding U.S. Appl. No. 11/952,222, 21 pages.
Final Office Action dated Apr. 30, 2012, regarding U.S. Appl. No. 11/952,222, 25 pages.
Office Action, dated Oct. 24, 2012, regarding U.S. Appl. No. 11/952,222, 39 pages.
Office Action, dated May 9, 2013, regarding U.S. Appl. No. 11/952,222, 27 pages.
Final Office Action dated Jan. 17, 2014, regarding U.S. Appl. No. 11/952,222, 37 pages.

* cited by examiner

APPARATUS FOR LAYUP PLACEMENT

CROSS-REFERENCE TO RELATED APPLICATIONS

This application is a divisional application of U.S. Pat. No. 9,770,871, filed May 22, 2007 and issued Jan. 21, 2010, and is related to U.S. Pat. No. 8,568,551 filed on May 22, 2007 and issued Jan. 21, 2010, which is incorporated by reference herein in its entirety.

TECHNICAL FIELD

The present disclosure relates generally to aircraft production and, more particularly, to airframe fabrication using composite materials.

BACKGROUND

Modern commercial aircraft are fabricated using substantial amounts of composite materials, which require manufacturing apparatus and techniques different from those used with metal component production. Automated fiber placement (AFP) machines were developed for the fabrication of large aircraft, with a typical AFP machine using a mandrel to place composite materials, usually as bundled composite fiber yarns, or tows, on the airframe. AFP mandrels can be massive, often weighing from 20 tons to over 100 tons, and are most efficient when used in continuous rotation around the fuselage barrel. However, it often is necessary to place one or more additional layers of composite materials on limited portions of the fuselage to reinforce certain locations, such as cut-outs and openings for ports, hatches, doors, etc. Moreover, these additional layers may need to be placed with an orientation or direction angle different from the primary orientation of continuous fiber placement. To place these additional layers, a typical AFP mandrel is stopped, repositioned, and restarted, leading to inefficiencies that may be unacceptable in the commercial production of large transport-class aircraft.

As a result, there is a need for apparatus and methods by which one or more additional layers of composite materials may be placed efficiently on limited portions of a wing and/or airframe without limitation and without stopping, repositioning, or restarting a typical AFP mandrel.

SUMMARY

In one embodiment, a method for layup placement on a layup structure is provided. The method includes iteratively loading a layup for the layup structure on a support frame of a saddle module; aligning the saddle module with a pre-selected registration position corresponding to a predetermined application path on the layup structure; and impressing the layup into forced contact with the layup structure along the predetermined application path using a predetermined application force.

In another embodiment, an apparatus for layup placement on a layup structure is provided. The apparatus includes a saddle module configured to receive a pre-selected composite material layup, wherein the saddle module is configured to place the pre-selected composite material layup on the layup structure over a predefined application path using a predefined application force.

In yet another aspect, an apparatus for layup placement on a layup structure is provided. The apparatus includes a plurality of saddle modules configured to operate in unison, wherein the plurality of saddle modules is configured to receive a pre-selected composite material layup.

This brief summary has been provided so that the nature of the various embodiments may be understood quickly. A more complete understanding of the embodiments can be obtained by reference to the following detailed description of the preferred embodiments thereof in connection with the attached drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
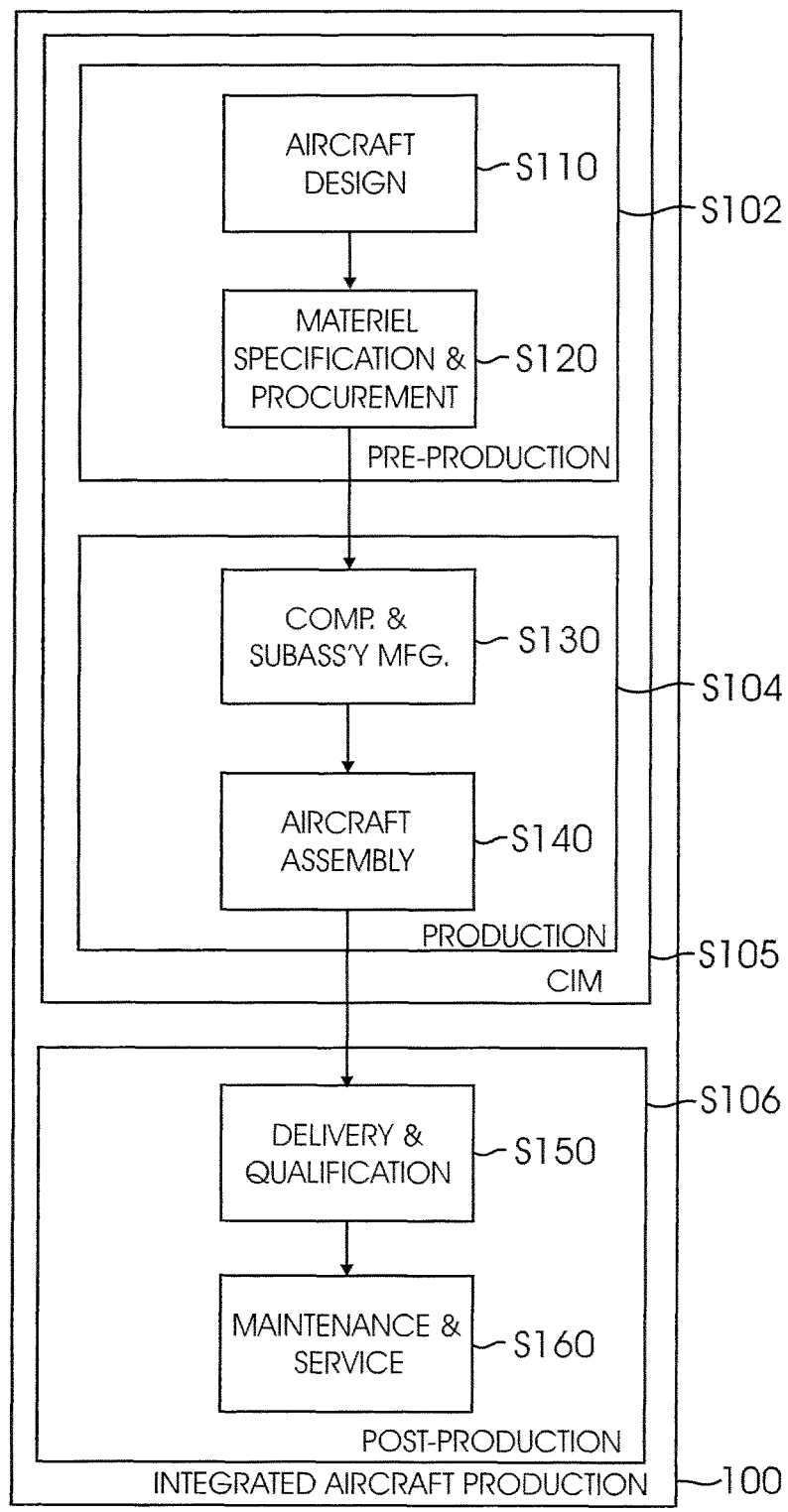
FIG. 1 is a flow diagram of an aircraft production process, in accordance with the present disclosure.

The present disclosure describes embodiments of a modular layup placement apparatus and corresponding methods, capable of accommodating a wide range of layup structure contours, geometries, sizes, and configurations.

As used herein, a "layup" refers to a shaped assembly, including composite materials, having one layer (lamina) or multiple layers. A multiple-layer layup may be fabricated in a stacked configuration, a sandwich configuration, or a combination thereof. A composite material may be a fiber matrix material having fibers arranged and surrounded by a support matrix material. In general, a fiber can refer to any suitable filamentary material, either natural or manmade, including, without limitation, carbon filamentary material, graphite filamentary material, polymer filamentary material, metal filamentary material, or a combination thereof. In addition, a metal filamentary material may include, without limitation, aluminum, stainless steel, titanium, or alloys, or organometallic combinations thereof. Fibers may be arranged in a fiber system as whiskers, collimated filaments, fiber yarns, woven fabric, ribbons, mats, or combinations thereof. One example of a composite material can be a reinforced composite material that is a combination of two or more constituent materials, which differ in physical properties, chemical properties, or both, which generally retain their respective properties in composition, and which may act synergistically to impart special properties to the resultant composite material. The terms "composite," and "reinforced composite" can be synonymous. In modern airframe manufacturing, the constituent materials generally include reinforcement material in the form of a fiber system, which is surrounded and maintained within a matrix system.

Fiber system reinforcement material may include, without limitation, glass fibers, carbon fibers, graphite fibers, metal fibers, or a combination thereof, which may be provided in numerous forms including, without limitation, a woven fabric, a non-woven fabric, a mat, a cloth, a scrim, a tape, a strand, a tow, or a combination thereof. In general, a tow is an untwisted bundle or yarn of generally parallel continuous filaments, including continuous carbon fiber filaments, which may be used alone or as a constituent of a fabric, a cloth, a tape, or combinations thereof. Typically, this yarn, and other material forms made from such yarn, can be identified by the number of filaments provided in each tow. For example, a carbon tow designated "6K" typically constitutes 6000 continuous carbon filaments. Similarly, a carbon fabric may be fabricated from 6K carbon tows in one or both of the warp and the fill. Although a layup may be described in terms of a carbon or a graphite material, present embodiments also encompass a layup in which one or more lamina may be constituted of a metal or metal composite material.

Also, a support matrix can be a material suitably constituted for embedding a selected fiber system, including an organic matrix material, a metallic matrix material, an intermetallic matrix material, or an organometallic matrix material. In one non-limiting example of a support matrix, a carbon fiber system may be embedded in a thermoset or thermoplastic material, such as toughened epoxy resin organic matrix material. A metallic matrix material can be constituted of one or more metals including, without limitation, aluminum, stainless steel, titanium, alloys, or intermetallic compounds, thereof. A non-limiting example of a matrix system can be a resin matrix system. A resin matrix system can be an organic polymer or prepolymer, which may have thermoset or thermoplastic properties, and which may contain a wide variety of components or additives to influence handling and processing behavior and physical properties. A resin matrix system also may be constituted for use as an adhesive, capable of producing surface attachment between, for example, adjacent composite material layers or a composite material layer and an airframe surface. An example of a commonly used resin matrix system can be a polymerizable thermosetting resin, such as an epoxy polymeric resin. Typically, resin matrix systems may be identified in terms of a nominal resin cure temperature, the resin type, and special material characteristics.

However, the embodiments herein are not limited to layups fabricated with a resin matrix system, and other suitable matrix systems may be employed. In addition, one or more layup lamina may be a layer of metal, or metal alloy, including, without limitation, aluminum or an aluminum alloy, stainless steel or a stainless steel alloy, titanium or a titanium alloy, magnesium or a magnesium alloy, or silicon carbide or a silicon carbide alloy. Also, one or more lamina may be fabricated from an intermetallic-matrix composite material, a metal-matrix composite material, or a ceramic composite material. Such matrix systems, and functional analogues, are well known in the art.

As used herein, a layup structure is a structure to which a layup may be applied. One example of a layup structure can be an airframe, or a portion thereof, including, without limitation, a fuselage, a wing, a canard, a cone, a fin, a door, a radome, a nose, an empennage, a nacelle, a strake, a spar, or a fairing. Another example of a layup structure can be a forming tool including, without limitation, a mold or a mandrel. A mold forming tool may be employed in the fabrication of an angular airframe portion such as, without limitation, a wing, a canard, a door, a radome, a strake, a spar, a fairing, or a portion thereof. Similarly, a mandrel forming tool may be employed in the fabrication of a cylindrical airframe portion including, without limitation a nose, a cone, a door, a radome, a fuselage, an empennage, a nacelle, or a portion thereof. Of course, other forming tools may be employed, and other layup structures may be selected. For convenience, certain embodiments herein may be described with respect to an airframe fuselage, although this is not to be taken as a limitation.

The layup structure may have a definable cross-sectional shape at each pre-selected registration position along the reference axis. An application width may describe a linear extent of a definable region of a layup structure surface at a pre-selected registration point along the reference axis. The linear extent of an application width is oriented generally perpendicularly to the application direction and generally along the reference axis. An untapered portion of a layup structure may exhibit a predetermined contour profile that remains substantially unchanged over the application width corresponding to a pre-selected registration point. However, the layup structure may be tapered along the reference axis, that is, have a varying cross-sectional shape, for example, along the layup structure reference axis. Thus, a tapered portion of a layup structure may exhibit a predetermined contour profile varying in three-dimensions over the extent of an application width. Accordingly, a pre-selected layup material may be configured to conform to a predetermined contour profile, which may vary in three dimensions along an application width corresponding to a pre-selected registration point.

The layup placement apparatus herein may be configured in one or more embodiments to place a layup fabricated from a pre-selected material in a definable spatial relationship on a structure, relative to a known fiducial location, or "home," within a corresponding spatial reference system. A fiducial location generally describes a known reference location that may be used by a human operator, or by a machine, to identify boundary conditions within a common spatial reference system and to identify selected locations in the spatial reference system with uniformly high precision. A workspace is a definable spatial reference system including a fiducial location.

By way of definition, to "correspond to" a known location is to be in a defined spatial relationship with that location. Also, registration is the process of establishing correspondences between a known fiducial location and a particular plane or set of planes within the workspace. Such a plane may define a local frame of reference. A registration position is an identified location for which such a local frame of reference has been established. Indexing is the process of establishing a point, or region, of operation within a local frame of reference; an indexed position is a point or region of operation so identified. A registration position may correspond to one or more indexed position(s) within a corresponding local frame of reference. As used herein, an indexed position, and the location of objects at the indexed position, may be made to correspond to a known fiducial location by making the registration position correspond to the known fiducial location. Accordingly, an indexed position can correspond to a unique location on the surface of a structure referenced to the known fiducial location in the workspace.

In addition, the term "application" is made with reference to placing a pre-selected layup material on the surface of a layup structure referenced in the workspace. The pre-selected layup material may be treated to adhere to the layup structure surface after it is placed. An application path can describe a definable region of the layup structure surface over which the layup material may be applied; an application direction can describe an orientation of an application path within the workspace, from a start point to an end point; and an application rate can describe time-referenced motion along the application path. Similarly, an application force can be a selectable force impressed upon layup material being placed along the application path. The application force can be impressed along the application path in the application direction; however, the application force has a direction and an orientation that generally are different from the application direction. For example, the application force direction may be normal to the application direction over at least part of the application path. In general, an application path can be referenced to a selectable registration position, and may be rectilinear or curvilinear.

"Inconsistencies," as the term is used in the appropriate context throughout this disclosure, refers to the difference between one or more measured characteristics of a composite structure that has been unaffected by exposure to external factors (including foreign object debris (FOD), thermal loads, structural loads, lightning, or electrical arcing) with the same one or more measured characteristics of a composite structure that has been affected by exposure to the external factors. "Inconsistencies," also includes the difference between one or more measured characteristics of a composite structure manufactured within design tolerances with the same one or more measured characteristics of a composite structure manufactured beyond design tolerances.

FIG. 1 illustrates an integrated aircraft production process 100, in accordance with embodiments of the present disclosure. As used herein, integrated aircraft production process 100 also may include manufacturing, support, or both. Typically, process 100 includes a pre-production phase (S102), a production phase (S104), and a post-production phase (S106). Pre-production phase S102 may include aircraft design, subassembly, and component design (S110), and materiel specification and procurement (S120). Material specification and procurement (S120) may include selection and procurement of components fabricated, or subassemblies manufactured, by third parties, without limitation, vendors, subcontractors, or suppliers. Production phase S104 may include component fabrication or subassembly manufacturing (S130), and aircraft assembly (S140). Pre-production phase (S102) and production phase (S104) can be elements of an integrated manufacturing process (S105), including one or more of aircraft and component design, development, and simulation processes; material, component, and sub-assembly specification and procurement processes; automated production planning processes; fabrication and assembly processes; and quality control processes.

Frequently, aspects of a modern aircraft production process, such as integrated process 100, do not end with final assembly but may extend over the service life of an aircraft, involving iterative and interactive collaborations between manufacturer, governmental authorities, customers and aircraft operators. Accordingly, integrated production process 100 can include post-production phase (S106). Post-production phase (S106) may include aircraft delivery and qualification (S150), and aircraft service (S160). Aircraft delivery and qualification (S150) may include providing an aircraft to customer specifications, which may have changed after an aircraft, was assembled. Thus, delivery and qualification can include repair, modification, or revision of one or more elements of an aircraft after delivery to a customer or operator. Also, it may be desirable to perform a modification, a repair, or an upgrade to an aircraft in the service interval between aircraft delivery and retirement. Therefore, aircraft service S160 can include repair, modification, or upgrade of a portion of an airframe, including an airframe manufactured or assembled using traditional, pre-existing materials, components, or subassemblies.

Apparatus and methods embodied herein may be employed during integrated production process 100 in one or more of phases S102, S104, or S106. For example, components or subassemblies corresponding to production phase S104 may be fabricated or manufactured in a manner similar to components or subassemblies procured during preproduction phase S102, and vice versa. Also, one or more of an apparatus embodiment, a method embodiment, or a combination thereof may be of particular benefit during production phase S104, for example, by substantially expediting assembly of an aircraft. One or more of an apparatus embodiment, a method embodiment or a combination thereof maybe of benefit during post-production phase 106, for example, without limitation to rework during delivery and qualification (S150) and/or maintenance and service (S160).

Figure 2:
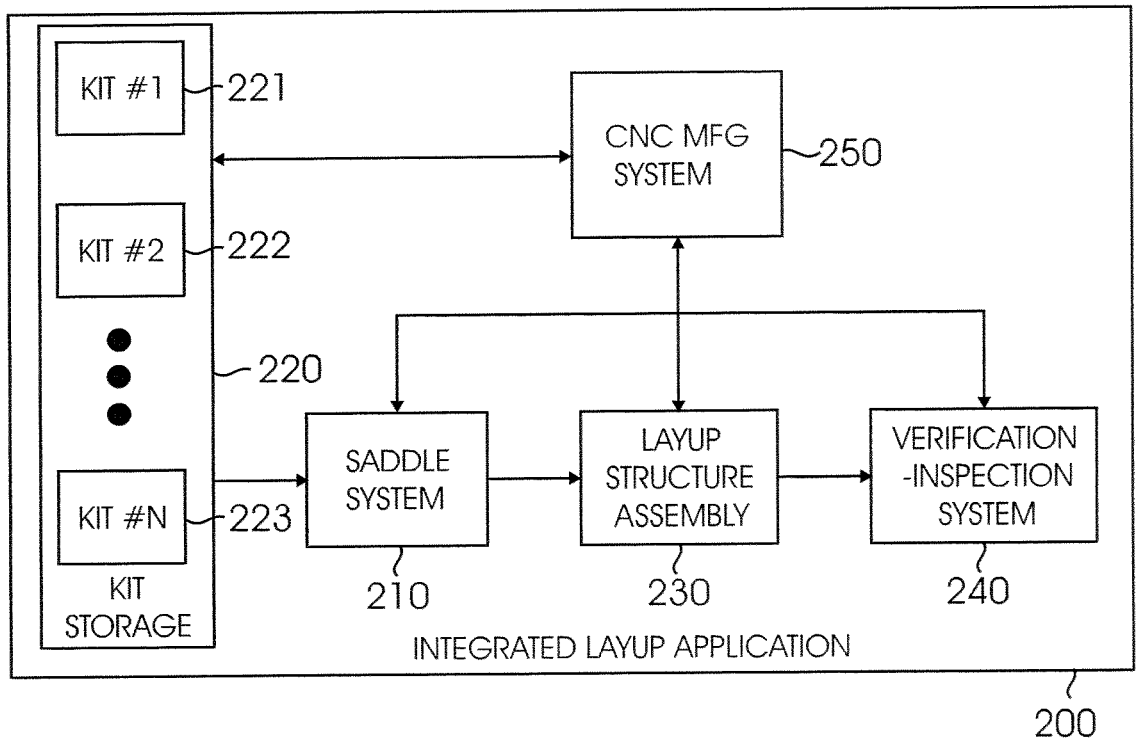
FIG. 2 is a graphical illustration of an integrated layup application, also in accordance with the present disclosure.
Figure 3:
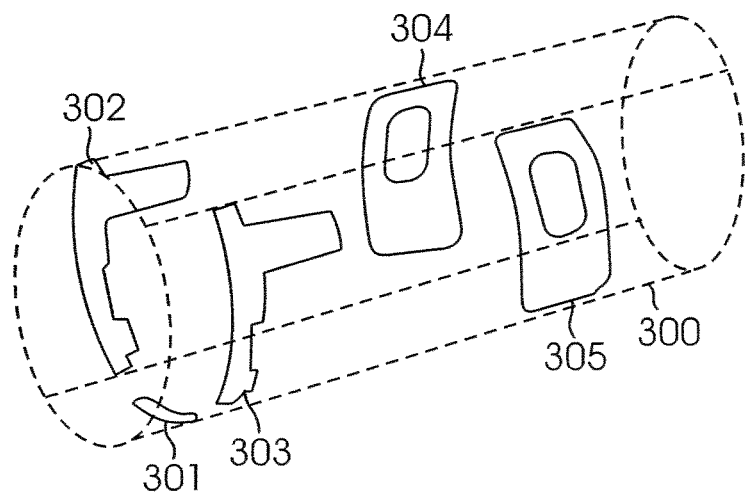
FIG. 3 is an illustration of multiple layups, which may be applied iteratively to a layup structure, in accordance with the teachings of present disclosure.
Figure 6:
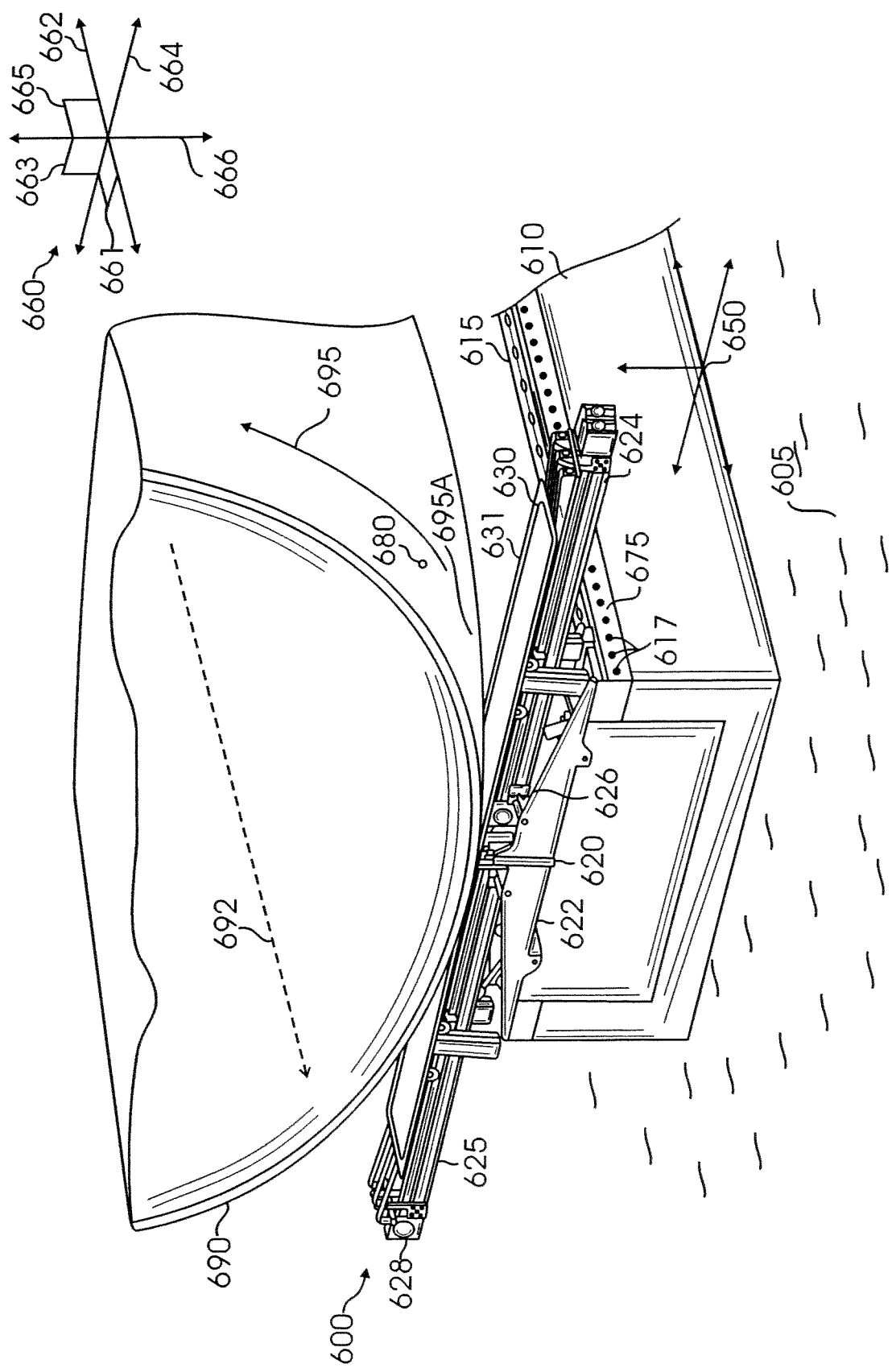
FIG. 6 is a graphical illustration of a layup placement apparatus, in accordance with an embodiment of the present disclosure.

FIG. 2 illustrates an embodiment of integrated layup application system (ILAS) 200, in accordance with embodiments of the present disclosure. FIG. 3 illustrates predefined composite layups 301-305, as may be placed upon layup structure 300 by ILAS 200. ILAS 200 may be used in one or more of phases S102, S104, or S106 of production process 100 in FIG. 1, and may employ layup application (hereinafter, saddle) system 210, layup structure assembly 230, and verification-inspection system 240. Non-limiting examples of saddle system 210 may include layup placement apparatus (hereinafter) LPA 600, LPA 700, or LPA 800, in FIG. 6, 7, or 8, respectively. A non-limiting example of a layup structure includes layup structure 300 in FIG. 3, and layup structure 690 in FIG. 6, 7, or 8. Advantageously, predefined composite layups 301-305 may be prefabricated in advance of application to layup structure 300, for example, at a fabrication facility separate from an airframe fabrication and assembly facility in which an aircraft may be manufactured using layup structure 300. After fabrication, one or more of predefined composite layups 301-305 may be provided as predefined composite layup kits, which may be inspected, stored, maintained, or delivered as inventory in a manner suitable for just-in-time manufacturing processes. In the context of FIG. 2, each composite layup 301-305 in FIG. 3 may be disposed upon a respective carrier 631 as shown in FIG. 6 to form a layup kit, as represented by respective pre-selected layup kits 221-223. Predefined composite layups 301-305 may be pre-patterned composite layups configured to conform to a contour of layup structure 300. One or more of pre-patterned composite layups 301-305 may have without limitation an aperture or a cutout, or be otherwise tailored for application to a predetermined portion of a particular layup structure 300, for example, at a preselected registration position.

One or multiple layup kits 221, 222, 223 may be fabricated for general application to a corresponding layup structure, as well as for a particular portion of an airframe, for a particular airframe, for a particular production run, or for a particular product line or product line variant, and thus may vary in size, shape, layers, composition, or a combination thereof. ILAS 200 also may include kit storage assembly 220. Prefabricated layup kits may be selected to suit current production needs, and stored in kit storage assembly 220. Kit storage assembly 220 can be configured to preserve pre-selected layup kits 221, 222, 223, for example, by ambient temperature, humidity, gas composition, or layup kit position control. As one non-limiting example, kit storage assembly 220 may be implemented as a cassette-type robotic assembly configured to dispense one of pre-selected layup kits 221, 222, 223, to saddle system 210, under the control of a human operator, or of CNC manufacturing system 250. After receiving a pre-selected layup kit 221, 222, or 223, saddle system 210 may be positioned relative to layup structure 300 and may cooperate with layup structure assembly 230 to apply the pre-patterned, predefined composite layup to a corresponding predetermined portion of a layup structure. Layup structure assembly 230 can hold a layup structure 300 in a predetermined fiducial location to facilitate precise positioning and placing of a predefined composite layup by saddle system 210 on the layup structure 300. One or both of saddle system 210 or layup structure assembly 230 may be controlled, at least in part, by CNC manufacturing system 250.

Figure 4:
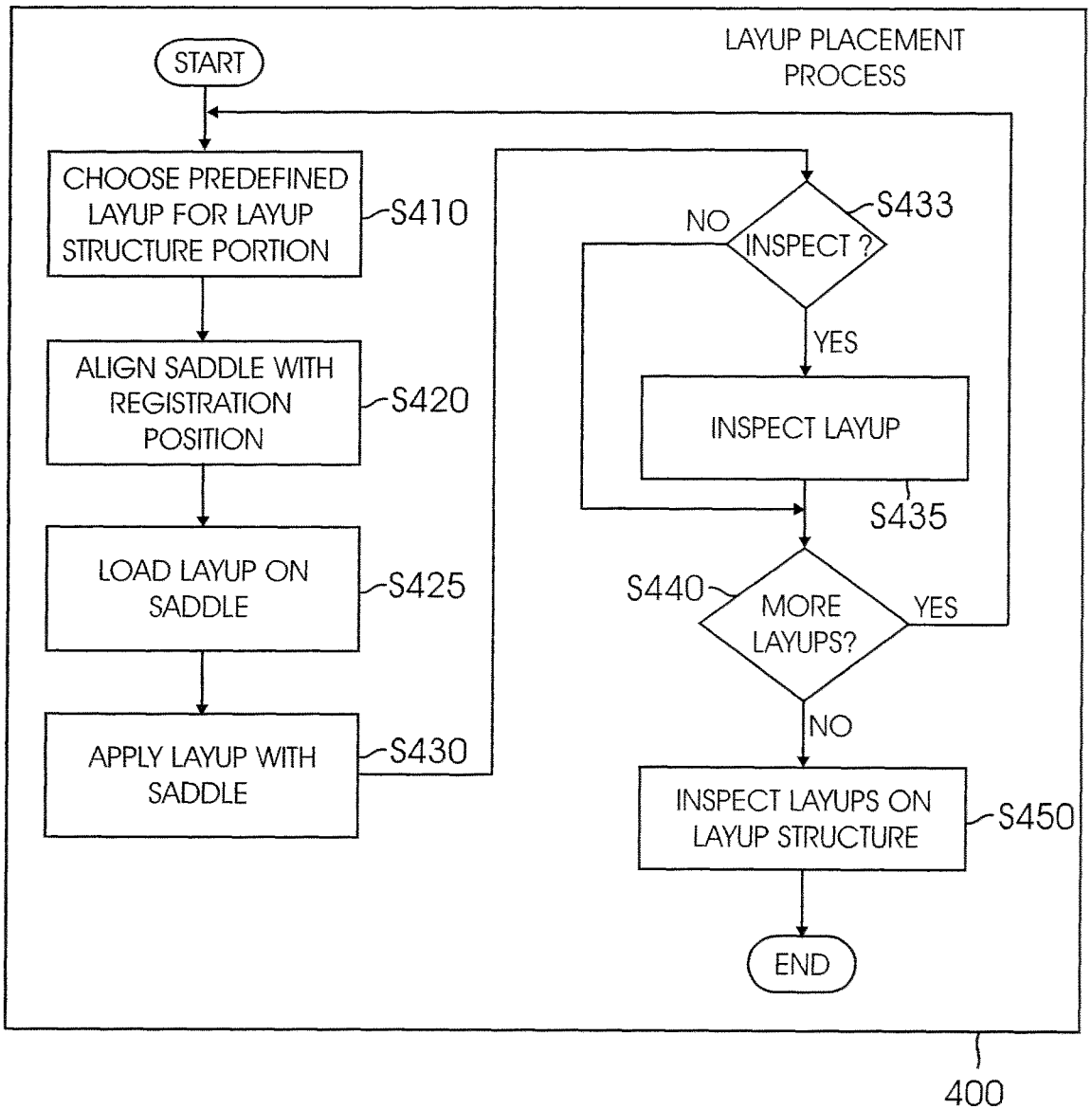
FIG. 4 is a flow diagram representative of an layup application process, in accordance with an embodiment of the present disclosure.

FIG. 4 illustrates an embodiment of layup application process (LAP) 400. LAP 400 may be used, without limitation, by example LPA 600 in FIG. 6, by example LPA 700 in FIG. 7, or by example LPA 800 in FIG. 8. However, it is not required that LAP 400 be practiced by any of these LPA or the saddle modules thereof. For expository purposes only, LAP 400 is described relative to the elements depicted in FIG. 6.

LAP 400 may begin by selecting a pre-selected layup (S410) to be applied to a pre-selected portion of a layup structure. In accordance with the foregoing, a suitable layup structure may be an airframe or a portion of an airframe, or may be a forming tool, such as a mold or a mandrel. For simplicity, LAP 400 can be described, without limitation, with respect a layup structure 690, such as a fuselage. Layup structure 690 also may be a portion of an airframe other than a fuselage, a mold forming tool, or a mandrel forming tool. Saddle module 620 can be aligned with layup structure 690 at a pre-selected registration position (S420), which is referenced to a predefined fiducial location. Also, a predetermined application path may be defined within a local frame of reference at the pre-selected registration position. For example, pre-selected registration position 675 can be referenced to fiducial location 650 and generally corresponds to predetermined application path 695 on layup structure 690.

Once aligned, the pre-selected layup kit (layup 630 and carrier 631) may be loaded (S425) onto support frame 628 of saddle module 620. Predefined registration position 675 may correspond to a predetermined layup structure contour profile. Pre-selected layup 630 may correspond to the respective predetermined layup structure contour profile at the pre-selected registration position 675. In selected embodiments of LAP 400, the pre-selected layup 630 can be a pre-patterned layup, configured to conform to predetermined layup structure features corresponding to the respective predetermined layup structure contour profile, at the pre-selected registration position. Pre-selected layup 630, typically having an initial flat form, can be placed on layup structure 690 along the contoured predetermined application path. When aligned with the layup structure 690 at a corresponding predetermined registration position 675, pre-selected layup 630 may be applied (S430) to the layup structure. Typically, the saddle module 620 retains the predefined layup 630 until applied to layup structure 690 by way of carrier 631.

After being applied to the layup structure, it may be desirable to verify the layup application, for example, by inspecting (S435) the positioning, configuration, or bonding, of layup 630 on the layup structure. Inspecting may include, without limitation, layup position verification, layup application inspection, or both. Position verification may be accomplished using a verification sensor including, without limitation, an optical, optoelectric, or optomechanical sensor, such as a laser-based surface scanner. Application inspection may be with respect to layup application to layup structure 690, to other composite material, or to a combination thereof. Inspecting may be performed, for example, using an electrical, electro-optical, or optical scanning system. Conveniently, suitable laser scanning systems are known in the art of airframe fabrication, manufacturing, and assembly, and may be used accordingly. Conveniently, laser-based scanning, sensing, and positioning systems are well known in the art.

Importantly, LAP 400 can provide for rapid, iterative placement of pre-selected layups 630 at one or more pre-selected registration positions 675 along the reference axis 695 of layup structure 690. After a first pre-selected layup is applied at a corresponding first pre-selected registration position, a second pre-selected layup may be selected and applied at a corresponding pre-selected registration.

Additional layups 630 may be applied iteratively (S440). Indeed, as a previous layup is being inspected, LAP 400 can provide for saddle module 620 to be moved to a subsequent pre-selected registration position, for a subsequent layup corresponding to the subsequent pre-selected registration position to be selected and loaded onto saddle module 620, and for the subsequent pre-selected layup to be applied to the layup structure as soon as it is practical to do so. A subsequent pre-selected layup may be placed at a different pre-selected registration position or may be placed at the same pre-selected registration position of a predecessor. In this way, it may be possible to apply a subsequent layup within minutes of applying a preceding pre-selected layup, potentially increasing layup application rates by one to two orders of magnitude, e.g., from 50 lbs/hr. to over 1000 lbs/hr.

Significantly, LAP 400 can be performed using high-precision automation techniques. In addition, it is desirable to employ one or more pre-patterned layups as a pre-selected layup, further reducing post-application trimming, manipulation, and re-work. Layup application inspection may be performed according to a pre-selected layup application standard, in which an applied layup may be examined for inconsistencies. In an implementation in which multiple layups may be applied to layup structure 690, inspection (S435) may be performed without limitation after each layup is applied, after a pre-selected number of layups are applied, after all layups are applied, or in a combination of aforementioned verifications. A final inspection of layups applied to the layup structure may be performed (S450) thereafter.

Figure 5:
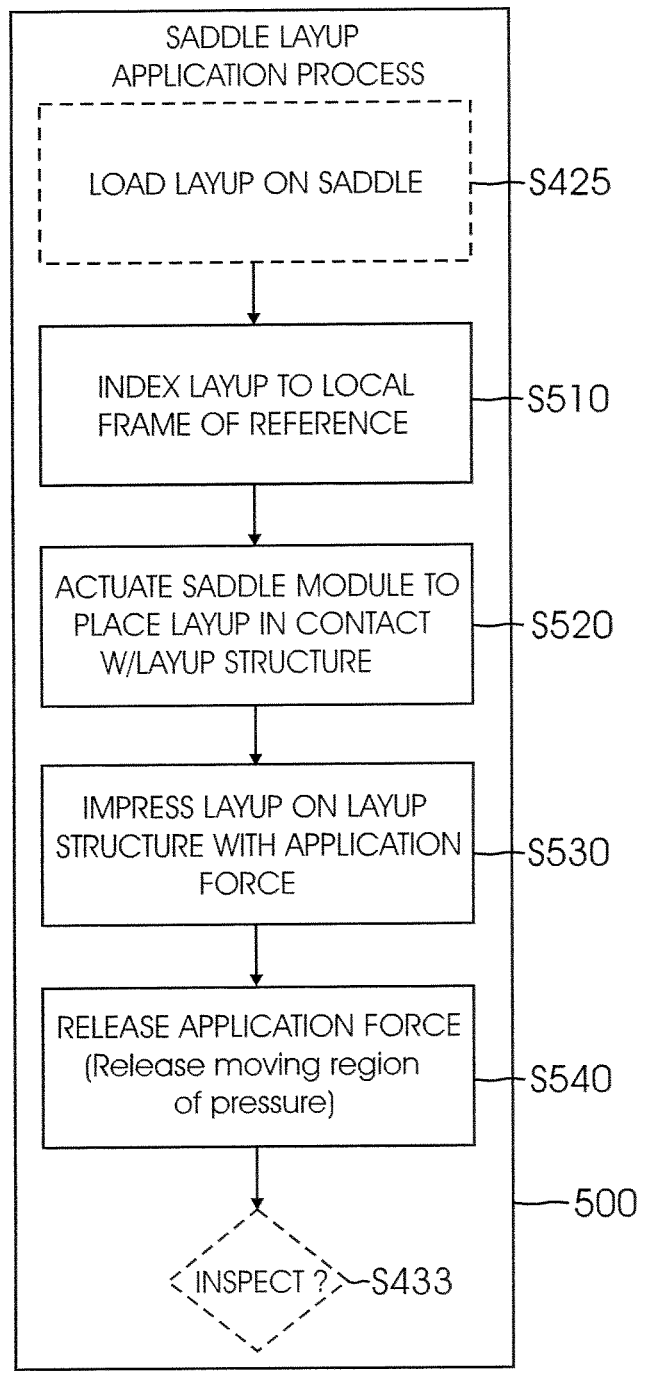
FIG. 5 is a flow diagram depicting an embodiment of a saddle module layup application process in conjunction with the process embodiment depicted in FIG. 4.

FIG. 5 generally depicts an embodiment of layup application method 500, by which pre-selected layup 630 may be applied to layup structure 690. Method 500 can be an implementation of layup application S430 in LAP 400 of FIG. 4, in which the pre-selected layup kit (630, 631) may be aligned (S420) with layup structure 690. In addition to being aligned with the layup structure, the pre-selected layup kit may be indexed (S510) in the local frame of reference, to correspond to a pre-selected indexed position on layup structure 690, for example, pre-selected indexed position 680 in FIG. 6.

After positioning, it may be desirable to actuate the saddle module (S520) to bring the layup kit proximate to the layup structure, such that a region of layup may be put into forced contact with a first selectable indexed position (for example, 680, FIG. 6) of the layup structure, using a predetermined application force. The first selectable indexed position (680) typically demarcates a starting application point (not shown) of the predetermined application path (for example, 695), corresponding to a pre-selected registration position (for example, 675), with an ending application point (not shown) being located at a second selectable indexed position (similar to 680) on the layup structure 690. The predetermined application force can be oriented generally axially inward to the centerline 692 of the layup structure, although a predetermined application force having a different axial orientation may be applied, for example, as may be desirable to suit a particular contour profile. Continuing the above example, saddle module 620 may be actuated to bring a first region of layup 630 into contact with a first selectable indexed position of layup structure 690, using a predetermined application force oriented generally in a predetermined application force direction.

A moving region of pressure may be progressively applied along the predetermined application path over a corresponding application width until the second selectable indexed position is reached (S530). The moving region of pressure impress a portion of the layup 630, proximate to the region of pressure 695A, into forced contact with a corresponding selectable indexed position (similar to 680) of the layup structure 690. The moving region of pressure 695A can be impressed using a predetermined application force, which can be oriented to a predetermined application force direction (for example, axially inwards towards centerline 692, FIGS. 6 and 7). The moving region of pressure 695A generally traverses the predetermined application path 695 at a predetermined application rate. Although the predetermined application force can be oriented generally axially inward to the layup structure reference axis 692, in certain embodiments it may be desirable to apply a predetermined application force having a different axial orientation, for example, as may be desirable to suit a particular contour profile.

Upon reaching the second selectable indexed position (for example, 680), the moving region of pressure 695A is released (S540) from the layup (i.e. application force is released). In general, it can be desirable to uniformly impress the predetermined application force over the predetermined application path 695, to selectively distribute the predetermined application force over the moving region of pressure 695A, or both, which may result in a layup application that can be substantially free of inconsistencies.

Figure 7:
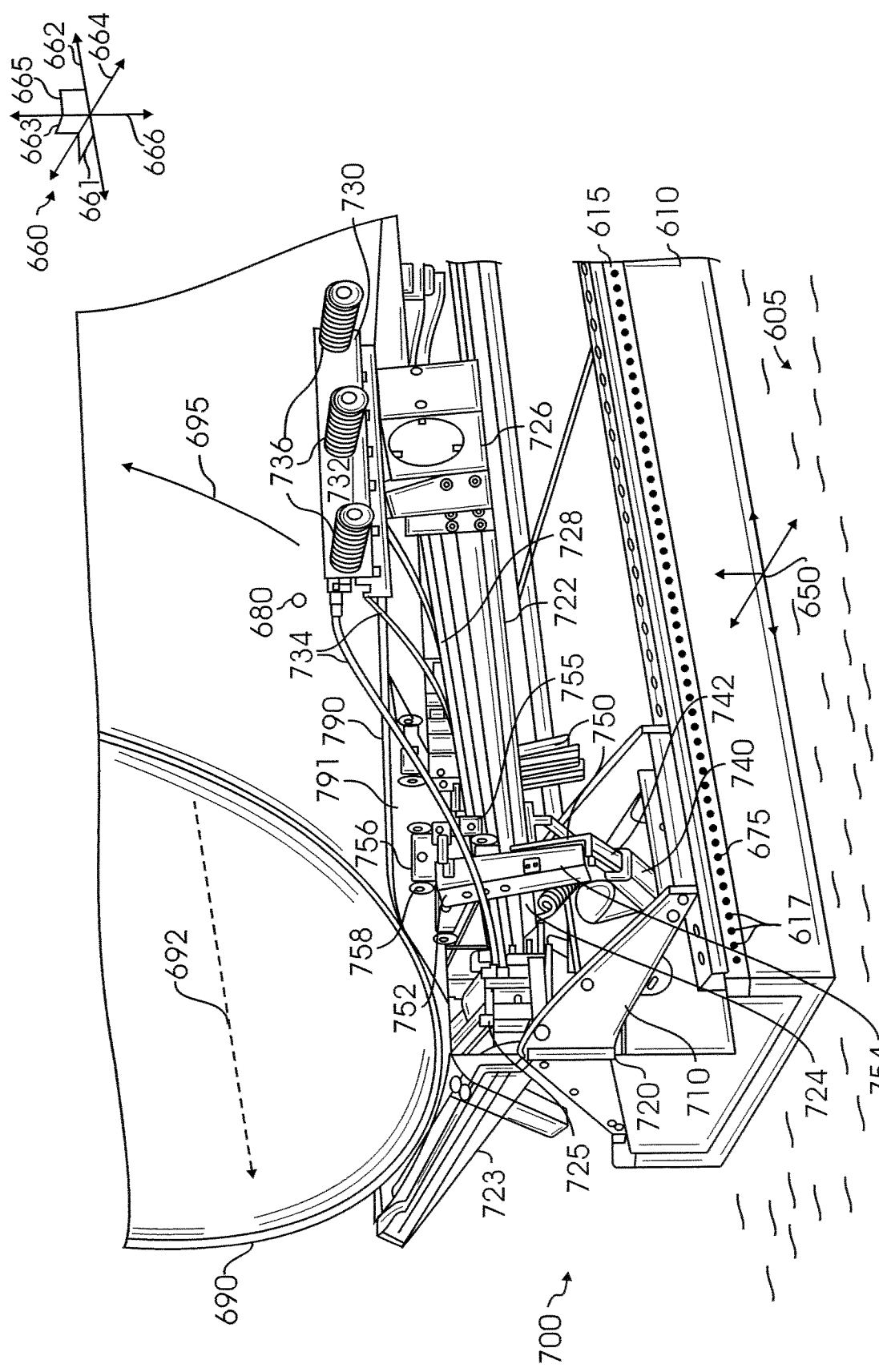
FIG. 7 illustrates a saddle module, which may be used by the apparatus in FIG. 6.
Figure 8:
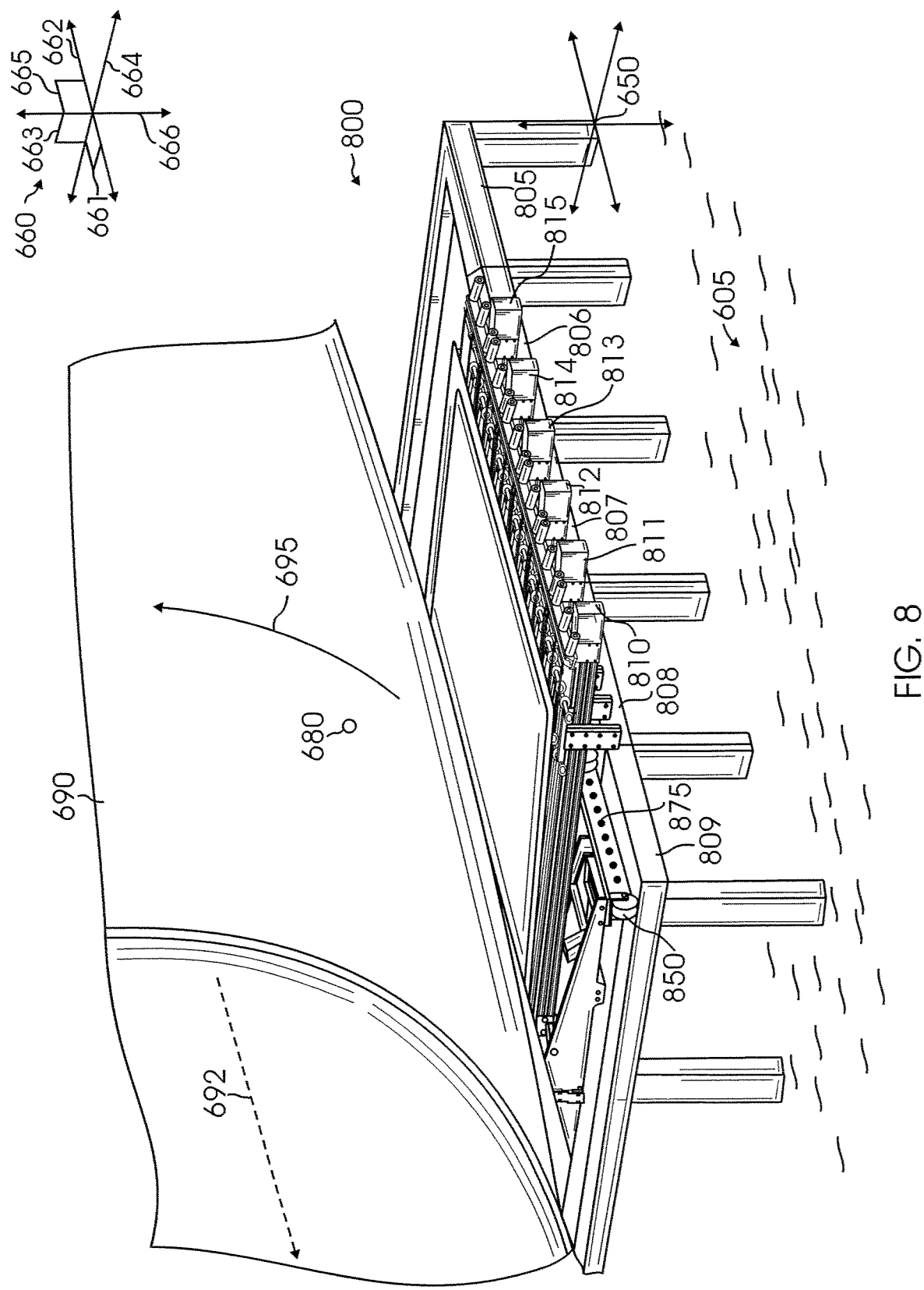
FIG. 8 illustrates a modular layup placement apparatus, in accordance with another embodiment of the present disclosure.

Without loss of generality, and with reference to FIGS. 6-8, predefined reference system 660 may be illustrated as a three-dimensional spatial reference system, which may extend along longitudinal (X) axis 662, transverse (Y) axis 664, and vertical (Z) axis 666. Within predefined reference system 660, there also may be defined horizontal (XY) plane 661, transverse-vertical (YZ) plane 663, and longitudinal-vertical (XZ) plane 665. However, it must be understood that predefined reference system 660, including related spatial, axial, or planar constructs, are provided for the purpose of illustration only, and that other constructs may be used, including, without limitation, those representing a polar coordinate reference system. For simplicity and without limitation, the present apparatus and method embodiments are illustrated with respect to an airframe structure, in particular, a commercial transport aircraft fuselage, although they are not limited thereto.

Turning to FIG. 6, exemplary layup placement apparatus (hereinafter) LPA 600 may include fiducial base 610, registration frame 615, and saddle module 620, and may be used during the fabrication of layup structure 690. Such fabrication may include selectively applying to (or, equivalently, placing on) layup structure 690 one or more pre-selected composite material layups, such as layup 630, at defined positions along the layup structure length (X-axis 662). Desirably, fiducial base 610 may be firmly affixed to facility foundation 605, thereby establishing predefined fiducial location 650, and, by extension, a defined workspace corresponding to predefined reference system 660. In general, layup structure 690 is oriented within the defined workspace. In particular, predefined fiducial location 650 unambiguously demarcates a known position within the defined workspace, and forms the basis for reliable and repeatable determination of any point or region within the defined workspace.

Accordingly, a human operator, or location-aware machine may use predefined fiducial location 650 to position an object, e.g., saddle module 620, accurately within the defined workspace, relative to layup structure 690, and to locate precisely desired points corresponding to layup structure 690. The location-aware machine may be a robot, guided by CNC system, such as CNC system 250 in FIG. 2. Layup structure 690 may be held in a fixed position in the defined workspace, relative to predefined fiducial location 650, and may be longitudinally aligned with X-axis 662. A particular registration position may be selected along longitudinal (X) axis 662, with a corresponding local frame of reference generally being defined in transverse-vertical (YZ) plane 663. In addition, the local frame of reference may correspond to a particular layup application path, with selectable indexed positions being defined therewithin on layup structure 690.

Not only does selectability of saddle module registration positions and layup indexed positions expedite the accurate application of predefined layups to layup structure 690, such selectability also facilitates reconfiguration of embodiments of LPA 600 within a workspace, as may occur with a change in airframe size, configuration, material, or specification. In accordance with the embodiments herein, LPA 600 may be reconfigured, yet remain fixed to fiducial location 650 and spatially-referenced to predefined spatial reference system 660. In addition, between manufacturing operations for different production parts, LPA 600 may be reconfigured, and be referenced to a different spatial reference system, for example, by fixing fiducial base 610 to a different fiducial location on foundation 605. In such an instance, re-referenced LPA 600 may be reconfigured, as previously described, within the newly-defined spatial reference system.

Layup structure 690 may be an elongated aeronautical structure longitudinally enclosed, at least in part, by an outer envelope, or skin. Registration frame 615 may extend generally along reference axis 662, for example a longitudinal axis, and may be securely attached to, and in alignment with, fiducial base 610, thereby facilitating the identification and selection of registration positions. Saddle module 620 can be engaged with registration frame 615 in alignment with a selectable registration position, such as pre-selected registration position 675, and can be oriented longitudinally in a transverse-vertical (YZ) plane corresponding to the selectable registration position. Layup structure 690 may be characterized by a respective predetermined contour profile corresponding to each pre-selected registration position 675 along reference axis 662. A predetermined application path can be described at each selectable registration position, such as at pre-selected registration position 675, with predetermined application direction being defined on layup structure 690 generally between a beginning application position and an end application position. Desirably, each of the beginning and end application positions are a selectable indexed position, for example, pre-selected indexed position 680.

Saddle module 620 may be configured to support and to retain layup 630, and can facilitate the application of predefined layup 630 (alternatively, layup) to layup structure 690 along predetermined application path 695, which may be defined at pre-selected registration position 675. Layup 630 may be in the form of, without limitation, a sheet, a panel, a patch, or a skin doubler. Also, layup 630 may be made of a suitable composite material, having a unilayer (uniply) or multilayer (multiply) construction. Although typically flat prior to application, predefined layup 630 may be sized and shaped for application to a particular portion of layup structure 690, which may be contoured and/or tapered. Layup 630 also may include precut shapes corresponding to layup structure features, including without limitation, a port, a hatch, or a door. For example and without limitation, layup 630 may be a preformed, vacuum-compacted, six-ply, composite laminate skin doubler intended to reinforce stress locations corresponding to a cargo door opening on layup structure 690. Layup 630 may be oriented relative to a selectable registration position along layup structure 690, such as pre-selected registration position 675.

Layup 630 can be supported on carrier 631 to facilitate the pre-application handling of layup 630, and subsequent application of layup 630 to layup structure 690. In general, carrier 631 can be configured to releasably attach to saddle module 620. Carrier 631 may be a flexible metal sheet shaped to receive layup 630, and configured to detach therefrom after layup 630 is placed on layup structure 690. Carrier 631 may have an indexing element configured to retain layup 630 in a selectable orientation on saddle module 620, for example, in a selectable indexed orientation corresponding pre-selected indexed position 680 on layup structure 690. Together, layup 630 and carrier 631 may constitute a layup kit (such as 221 of FIG. 2), which kit may have been previously prepared in a location distant to the workspace.

In general, saddle module 620 may include articulated locator 622, saddle base 626, and support frame 628. Articulated locator 622 can be longitudinally oriented to transverse generally along reference (Y) axis 664, for example, a transverse axis, and may be positioned beneath layup structure 690, relative to axis 662, at pre-selected registration position 675. In certain embodiments, articulated locator 622 can be configured to include locator arms 624, 625, each being pivotably mounted on a respective proximal end to saddle base 626. Locator arms 624, 625 typically are disposed, controlled, positioned, and operated symmetrically and complementarily, with respect to layup structure 690. However, in selected embodiments, saddle module may be configured to permit locator arm 624 to be controlled, positioned, and operated independently of locator arm 625. Support frame 628 can be attached to respective distal portions of locator arms 624, 625. In addition, support frame 628 can be configured to retain a layup kit 221 (e.g., layup 630 releasably mounted on carrier 631) during manipulation and can provide indexing of the layup kit, for example, using an indexing element on carrier 631, so that layup 630 is constrained in a selectable indexed orientation relative to layup structure 690, on support frame 628.

Advantageously, this indexing can be made to occur within the local frame of reference, as defined at pre-selected registration position 675, such that a region on layup 630 may correspond to pre-selected indexed position 680 on layup structure 690. Pre-selected indexed position 680 generally corresponds to pre-selected registration position 675 which, in turn, may be made to correspond to predefined fiducial location 650, so that the spatial location corresponding to pre-selected indexed position 680 may be determined unambiguously. In general, locator arms 624, 625 can be adducted toward layup structure 690 so that layup 630 may precisely contact layup structure 690 relative to predefined fiducial location 650, for example, at pre-selected indexed position 680. Pre-selected indexed position 680 may correspond to one or more selected reference planes within predefined spatial reference system 660 including, without limitation, horizontal plane 661, transverse-vertical plane 663, longitudinal-vertical plane 665, a plane corresponding to a predetermined combination thereof, or any other plane defined within predefined spatial reference system 660.

Registration frame 615 can support saddle module 620, and can facilitate its repositioning along layup structure 690, relative to reference axis 662. Typically, saddle module 620 can be transversely engaged with registration frame 615. Beneficially, saddle module 620 may be moved, positioned, relative to predefined fiducial location 650, at a selectable registration position on registration frame 615, such as at pre-selected registration position 675. Saddle module 620 may be moved manually along axis 662 to pre-selected registration position 675, and also may be adapted for automated longitudinal positioning, for example, using a computer-controlled positioning machine. Once positioned, saddle module 620 may be firmly affixed to reference frame 615, for example by bolting, clamping, or otherwise securing, such that the movement of saddle module 620 may be substantially prevented.

Registration positions, such as pre-selected registration position 675, may be demarcated by mechanical and electronic methods known to the art, including, without limitation, indicia 617 affixed to registration frame 615, mechanical indexing apparatus, or electrical, electro-optic, or electromechanical position sensors. In selected embodiments, LPA 400 may be configured to have multiple saddle modules 620 disposed along X axis 662. In addition, registration frame 615 may be modularly configured so that registration frame modules may be joined or removed along axis 662, thereby adapting the length of registration frame 615 to suit a particular layup task or layup structure. Beneficially, registration frame 615 may be configured with an open end to facilitate attaching and removing additional saddle module 620. Thus, LPA 600 can be operated to place layup 630 onto layup structure 690, relative to pre-selected indexed position 680, along a predetermined application path 695 at a predetermined application force rate, and using a predetermined application force applied. As described with respect to LPA 800 in FIG. 8, LPA 400 may be configured to accommodate plural saddle modules, such as saddle module 620, each capable of being moved to a respective registration position. Typically, each moveable saddle module 620 may be positioned at respective selectable registration positions 675, and each may be capable of holding a respective layup 630 at a respective indexed location 680 corresponding to the respective pre-selected registration position 675.

FIG. 7 illustrates an embodiment of saddle module 700, including saddle base 710, locator assembly 720, support frame 730, locator motive assembly 740, and force applicator assembly 750. Saddle module 700 may be implemented, for example, as saddle module 620 in LPA 600 of FIG. 6. For the purposes of illustration, saddle module 700 is spatially referenced to predefined spatial reference frame 660. Locator assembly 720 may be an articulated locator including first locator arm 722 and second locator arm 723. For convenience, operation of locator 720 will be described relative to first locator arm 722. However, each of locator arms 722 and 723 may be identical in structure and complementary in function, so that a description regarding first locator arm 722 also may pertain to second locator arm 723.

First locator arm 722 includes proximal locator arm portion 724 and distal locator arm portion 726. Typically, locator assembly 720 longitudinally corresponds to transverse (Y) axis 664, for example, when saddle module 700 is deactuated, and locator arm 722 is laid generally flat. Proximal locator arm portion 724 of first locator arm 722 may be pivotably mounted to saddle base 710 to allow distal locator arm portion 726 to move in the local Y-Z plane 663. Also, locator assembly 720 may include one or more indexing elements, such as an indexing pin 725, which may mate with an indexing element on carrier 791 to constrain the positioning of layup 790 relative to layup structure 690, such that layup 790 can be aligned to a selectable indexed position, such as pre-selected indexed position 680 on layup structure 690. Layup 790 and carrier 791 may be representative of layup 630 and carrier 631, respectively.

In general, support frame 730 can support a layup kit (e.g., layup 790 and carrier 791) before and during application, and may include one or more support straps 734 tensionably attached between first locator arm 722 and second locator arm 723. Typically, each end of straps 734 is attached a respective locator arm by a keeper, such as keeper 732 on first locator arm 722. Straps 734 may be held in adjustable tension with the keepers 732 by spring-loaded tensioners, for example, spring-loaded tensioners 736 may hold one end of straps 734 in adjustable tension with keeper 732. Of course, other support structures may be attached to support frame 730, for example, a mesh, belt, or other flexible member, or any other form of tensioners may be used. Typically, support straps 734 are configured to suitably support carrier 791 during application which, in turn, supports layup 790.

Locator motive assembly 740 can be linked to impart axial motion to locator arm 722 with respect to axis 662. An exemplary locator motive assembly 740 may include at least one pistoned cylinder 742 for each locator arm 722. Pistoned cylinder 742 may actuate locator arm 722 with pressurized fluid using known hydraulic or pneumatic techniques, or by a combination thereof. Thus, when actuated, locator motive assembly 740 can drive locator arm distal portion 726 axially away from saddle base 710, such that support frame 730 and, by extension, layup 790, is urged toward, and into forced contact with, layup structure 690. Typically, locator assembly 720 rises up towards layup structure 690 during actuation to bring a region of layup 790 into contact with a first selectable indexed position of layup structure 690, generally describing a starting application point on a corresponding predetermined application path.

Force applicator assembly 750 may include at least one force applicator 752 retained and guided generally longitudinally along locator arm 722. Exemplary force applicator 752 can include guide stanchion 754, to which truck 756 may be attached. Guide stanchion 754 can include guide mover 755 that is configured to engage longitudinal locator arm guide track 728. Guide mover 755 may be actuated to traverse locator arm guide track 728 along a predetermined application path, in predetermined application direction, and at a predetermined application rate, for example, by an electric motor. In addition, multiple rollers 758 may be attached to truck 756 to facilitate movement along the predetermined application path. Guide mover 755 also may employ fluid pressure, for example, pneumatic pressure, to adjust the position of guide stanchion 754 and to apply the predetermined application force to truck 756 through guide stanchion 754, along an axis normal to locator arm 722. Pressurized fluid actuation may be beneficial where it is desired to impress layup 790 upon layup structure 690 with a suitably large force.

Multiple rollers 758 may be attached to truck 756 to facilitate uniform movement of force applicator assembly 750 over the layup kit. Conveniently, rollers 758 convey the predetermined application force from truck 756 to carrier 791 and layup 790, and generate a moving, and generally uniform, region of pressure that brings layup 790 into forced contact with layup structure 690 at points along the predetermined application path, for example, at pre-selected indexed position 680. The forced contact between layup 790 and layup structure 690 can be made with the predetermined application force being oriented generally in a predetermined application force direction. The predetermined application force can be oriented generally axially inward to the centerline 692 of layup structure 690, although force applicator assembly 750 may be operated to apply a predetermined application force having a different axial orientation, for example, as may be desirable to suit a particular contour profile. Rollers 758 can be spaced apart to define a suitable moving region of pressure while traversing the predetermined application path and, advantageously, may be configured to cooperate with carrier 391 to distribute selectively the force conveyed from truck 756 to layup 790.

Guide mover 725 can be configured to make smooth, progressive motion along locator arm guide track 728, as it traverses the predetermined application path corresponding to pre-selected registration position 675. Guide mover 725 also can be configured to impress uniformly a predetermined application force on layup 790 in a predetermined application force direction. The moving region of pressure may be continuously applied to layup 790 over the span of the predetermined application path, and may be released at a second selectable indexed position describing the terminal application point of the corresponding predetermined application path. After layup 790 is applied to the terminal application point, first locator arm 722 and second locator arm 723 are released and causing distal locator arm portion 726 to be abducted from layup structure 690. After layup 790 is applied to layup structure 690, carrier 391 can be retained on support frame 730, pulled away from layup structure 690, and generally laid flat to facilitate removal from saddle module 700. One or more additional layups may be so applied subsequently. Because of the uniformly-made forced contact, layup 790 can be placed on layup structure 690 in a manner that is substantially free of inconsistencies.

Although saddle module 700 may be configured to operate symmetrically, by which the positioning, operation, or function of locator arm 722 is complementarily matched by locator arm 723, certain embodiments of saddle module 700 may be configured to operate first locator arm 722 independently from second locator arm 723. For example, locator arm 722 may be operated to place a layup kit on a layup structure 690 proximate to first locator arm 722, while second locator arm 723 is disposed at rest. Similarly, certain embodiments of saddle module 700 may be operated such that a first predetermined application force may be applied by way of first locator arm 722 and a different, second predetermined application force may be applied by second locator arm 723. Accordingly, saddle module 700 can use force applicator assembly 750 to place layup 790 onto layup structure 690 along a predetermined application path, using a predetermined application force, which may be oriented in a predetermined application force direction and applied at a predetermined application rate.

FIG. 8 illustrates an embodiment of LPA 800, which may be similar functionally to LPA 600 in FIG. 6. LPA 800 may include multiple saddle modules 810-815, which may be longitudinally-joined and configured to act generally in unison. LPA 800 may be desirable, for example, to accommodate the application of large layup 830 over a larger portion of layup structure 690. Each of modules 810-815 can be structurally and functionally similar to saddle module 620 in FIG. 6 and saddle module 700 in FIG. 7. Accordingly, LPA 800 can place a wider layup 830 (i.e., covers a greater longitudinal portion of layup structure 690) than layup 630, thus facilitating the rapid application of multiple large layups 830 of precut, multi-ply composite material onto layup structure 690. LPA 800 also may include modular registration frame 850, which may be configured along axis 662 from one or more registration frames, similar to registration frame 615 in FIG. 6. Saddle modules 810-815 may be joined to form a unitary saddle module, which may be moved in unison along reference axis 662 to predetermined registration position 875 on registration frame 850. However, selected embodiments of LPA 800 may employ independently operable embodiments of saddle modules 810-815, for example, to adjust to a longitudinally-varying contour profile of layup structure 690.

Using an exemplary prototype of an LPA, such as LPA 800 having multiple saddle modules 810-815, and using a method such as LAP 400 in FIG. 4, a large prototype layup, such as layup 830, can be placed on a barrel-shaped structure, representative of aircraft layup structure 690, within a few minutes and in a manner that was substantially inconsistency free. The aforementioned prototype layup was disposed on a prototype indexed carrier, had approximate dimensions of twelve feet by fifteen feet, and included a six-ply composite layup, bearing precut features. The exemplary prototype was capable of placing in excess of about 1000 lbs of composite materials per hour on the barrel, in contrast to conventional AFP machines and techniques, which may place less than about 50 pounds per hour. Advantageously, the layups, used in accordance with the apparatus and methods described herein, may be cut, finished, and inspected prior to application, potentially reducing manufacturing costs by facilitating expeditious fabrication of the manufactured structure, with reduced material waste and post-application manipulation. In addition, apparatus and methods embodied herein may permit an AFP machine associated with airframe fabrication to operate more continuously, thereby increasing overall manufacturing efficiency.

Moreover, a layup structure, after having a pre-kitted layup placed using the disclosed apparatus, methods, or both, also may have one or more layers of reinforced fibers wound around the layup and surrounding portions of the layup structure, allowing an AFP machine to operate with increased continuity, relative to current apparatus and methods.

FIGS. 9A-9E depict example embodiments of a pre-selected layup kit including a multi-ply layup, suitable for application to layup structure 690. Each of layup kits 900, 920, 940, 960, and 980, include carrier 990 and release layer 991 on which the respective layups may be formed. Typically, the respective layups are formed on an obverse surface of carrier 990, with release layer 991 being interposed between carrier 990 and the respective layup. One or more of the layup lamina in one or more of layup kits 900, 920, 940, 960, or 980 may be fabricated from a reinforced fiber-resin matrix material, an intermetallic-matrix composite material, a metal-matrix composite material, a ceramic composite material, or a metal or metal alloy material, although other suitable matrix systems may be employed.

Figure 9A:
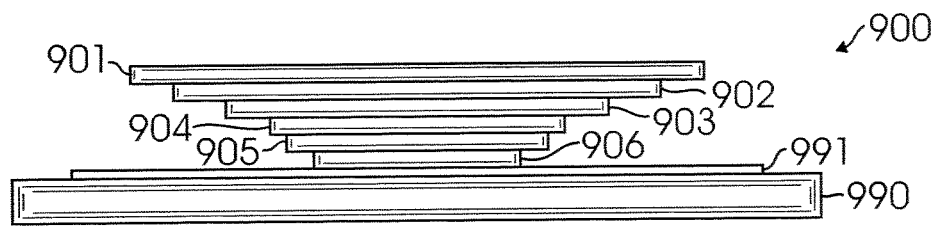
FIGS. 9A-9F illustrate examples of layups which may be applied in accordance with the teachings of present disclosure.

In. FIG. 9A, layup kit 900 is depicted as having a multi-ply layup with six lamina 901-906 formed on an obverse surface of carrier 990. Layup (lamina 901-906) is arranged in a stacked configuration, with lamina 901 being the uppermost lamina and lamina 906 being the lowermost lamina. As fabricated on carrier 990, lamina 906 may be the first layup ply laid down, proceeding in succession to lamina 901. As placed on a layup structure, such as layup structure 690, lamina 901 may be disposed most proximately to layup structure 690 and lamina 906 may be the outermost, relative to a layup structure surface.

Figure 9B:
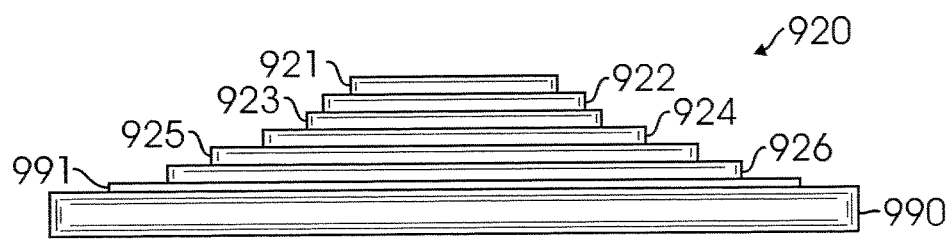

FIG. 9B depicts an alternative embodiment in which layup kit 920 includes a stacked, multi-ply layup having six lamina 921-926 formed on an obverse surface of carrier 990. In layup kit 920, lamina 921 may be the uppermost lamina and lamina 926 may be the lowermost. As fabricated on carrier 990, lamina 926 may be the first layup ply laid down, proceeding in succession to lamina 921. As placed on a layup structure, lamina 921 may be disposed most proximately to layup structure 690 and lamina 926 may be the outermost, relative to a layup structure surface.

In some applications, such as interiorly applied doublers, an abrupt transition may be acceptable. However, in other application, such as layup applied to layup structure surfaces corresponding to an airframe exterior, it may be desirable to provide a smoothed surface over abrupt lamina transitions, thereby improving interlaminar adhesion and other properties. A smoothed surface also may improve aerodynamic characteristics for external layups, such as a skin doubler. Examples of an abrupt lamina transition may include a multi-ply, stacked layup or a multi-ply sandwiched layup. Layup kits 900 and 920 may be examples of a layup with a stacked configuration.

Figure 9C:
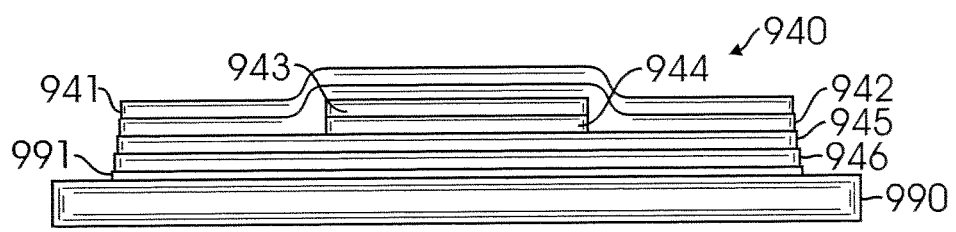

FIG. 9C illustrates layup kit 940, having six lamina 941-946 formed in a sandwich configuration on an obverse surface of carrier 990. In layup kit 940, lamina 941 may be the uppermost lamina and lamina 946 may be the lowermost. As fabricated on carrier 990, lamina 946 may be the first layup ply laid down, proceeding in succession to lamina 941. As placed on a layup structure, lamina 941 may be disposed most proximately to layup structure 690 and lamina 946 may be the outermost, relative to a layup structure surface. Laminae 943 and 944 form a single-stepped transition. Layup kit 940 provides a smoothed surface, for example, by overlapping one or more layers, such as laminae 941 and 942 over the abrupt transition from laminae 943-944.

Figure 9D:
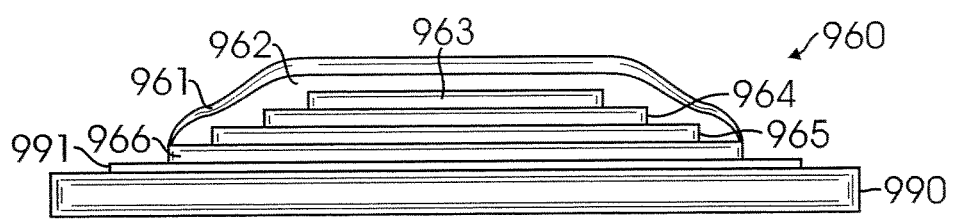

FIG. 9D illustrates layup kit 960, having six lamina 961-966 formed in a sandwich configuration on an obverse surface of carrier 990. In layup kit 960, lamina 961 may be the uppermost lamina and lamina 966 may be the lowermost. As fabricated on carrier 990, lamina 966 may be the first layup ply laid down, proceeding in succession to lamina 961. As placed on a layup structure, lamina 961 may be disposed most proximately to layup structure 690 and lamina 966 may be the outermost, relative to a layup structure surface. Laminae 963 and 964 form a multi-stepped transition. Layup kit 960 provides a smoothed surface, for example, by overlapping one or more layers, such as laminae 961 and 962 over the transition formed by laminae 963-964.

Figure 9E:
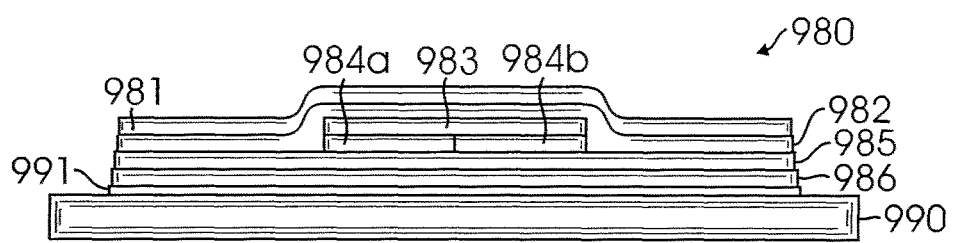

FIG. 9E illustrates layup kit 980, having six lamina 981-986 formed in a sandwich configuration on an obverse surface of carrier 990. In layup kit 980, lamina 981 may be the uppermost lamina and lamina 986 may be the lowermost. As fabricated on carrier 990, lamina 986 may be the first layup ply laid down, proceeding in succession to lamina 981. As placed on a layup structure, lamina 981 may be disposed most proximately to layup structure 690 and lamina 986 may be the outermost, relative to a layup structure surface. Laminae 983 and 984a-b form a single-stepped transition. Laminae 984a and 984b present a layer discontinuity within layup kit 980. Lamina 983 provides an overlapping lamination which may ameliorate inconsistencies related to the layer discontinuity. In addition, layup kit 980 provides a smoothed surface, for example, by overlapping one or more layers, such as laminae 981 and 982 over the transition formed by laminae 983-984a-b.

Figure 9F:
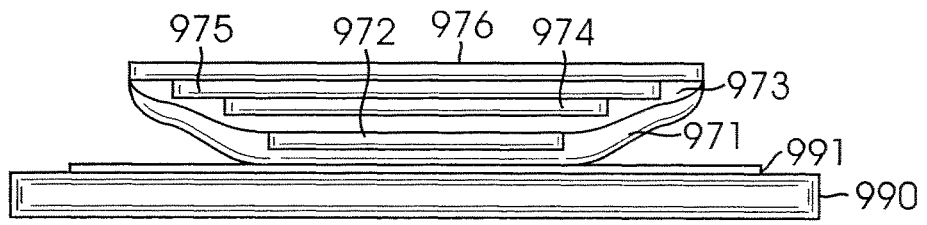

FIG. 9F illustrates layup kit 970, having six lamina 971-976 formed in a sandwich configuration on an obverse surface of carrier 990. In layup kit 970, lamina 976 may be the uppermost lamina and lamina 971 may be the lowermost. As fabricated on carrier 990, lamina 971 may be the first layup ply laid down, proceeding in succession to lamina 976. As placed on a layup structure, lamina 976 may be disposed most proximately to layup structure 690 and lamina 971 may be the outermost, relative to a layup structure surface. Laminae 974-976 form a multi-stepped transition. Layup kit 970 provides a smoothed surface, for example, by overlapping one or more layers, such as laminae 973 over laminae 974-976. Lamina 972 may be applied over laminae 973-976, and create another discontinuity.

Lamina 971 may be provided as a smoothing layer over lamina 972, which also may have the practical effect of interlocking laminae 971-972 with laminae 973-976. Laminae 973-976 may represent, for example, a fuselage layup, and laminae 971-972 may represent, for example, a skin doubler layup applied over the fuselage layup. Laminae 971-972 and laminae 973-976 are depicted as being fabricated on a single carrier. However, apparatus and methods in the present disclosure contemplate a first layup being applied, at least in part, on a second layup, so that laminae 971-972 may be applied subsequently to laminae 973-976. In such an application, laminae 973-976 may be initially applied to a layup structure using a first layup kit, with laminae 971-972 representing a second layup being applied to at least a portion of the first layup 973-976.

In selected applications, it may be desirable to provide a forming tool having a surface modified to receive and/or accommodate the innermost lamina of a multi-play layup, such as the respective layups of kits 900, 920, 940, 960, or 980, which may exhibit a blistered protruding, or bulging surface. In addition, the outermost lamina of layups, which may be proximate to an outer aerodynamic surface of an aircraft, may be worked to smooth and fair the outer layup structure surface, and thereby reduce aerodynamic drag amongst other benefits.

Figure 10A:
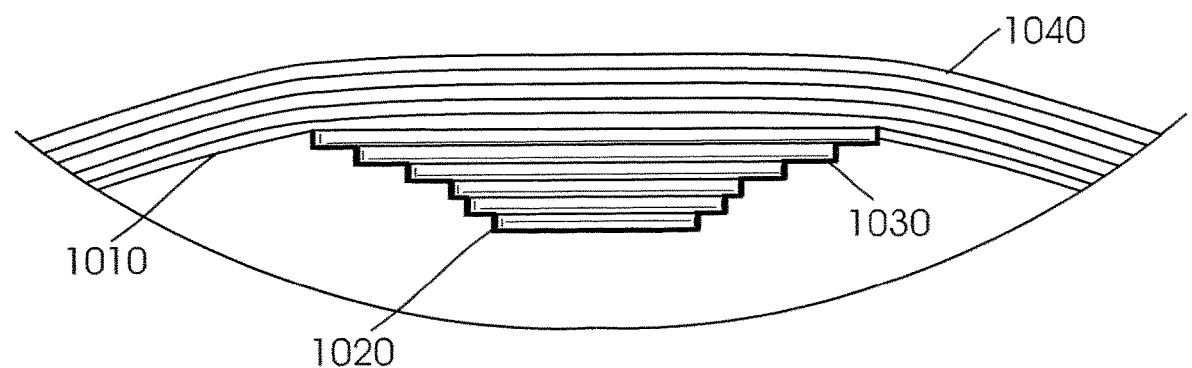
FIGS. 10A-10D illustrates a contoured-surface forming tool, which may be used in conjunction with disclosed apparatus and method embodiments.

In FIG. 10A contoured mandrel 1010 represents a forming tool having a surface modified to accept multi-ply layup 1020. Layup 1020 may be similar to that provided with layup kit 920 in FIG. 9B, and have an abrupt, multi-stepped, discontinuous surface. Such a contoured-surface forming tool arrangement may be desirable where a multi-ply layup 1020, such as a skin doubler, may be placed on a door, a port, or a hatch aperture on an airframe portion corresponding to mandrel 1010, and where it also is desirable to maintain the fair of the resulting airframe surface relative to the rest of the airframe structure. One or more of LAP 400, process 500, or LPA 600, 700, or 800, may be used in conjunction with a contoured surface forming tool, such as mandrel 1010.

Figure 10B:
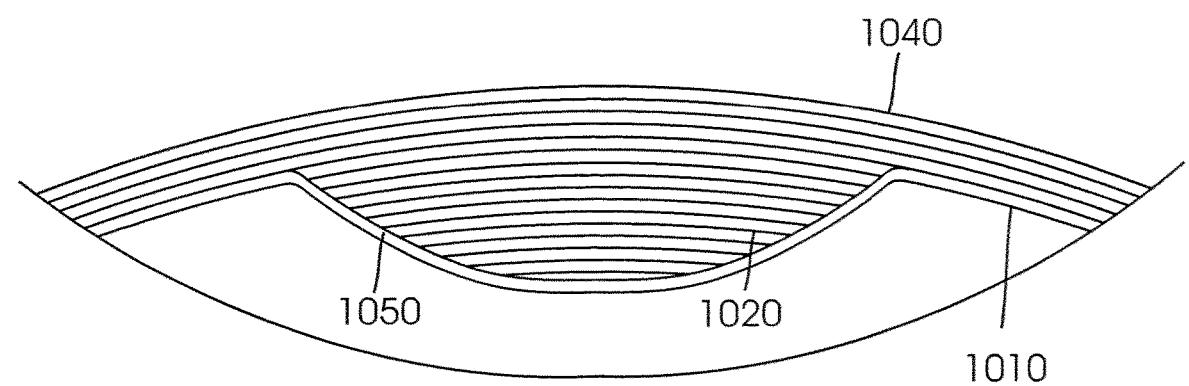
Figure 10C:
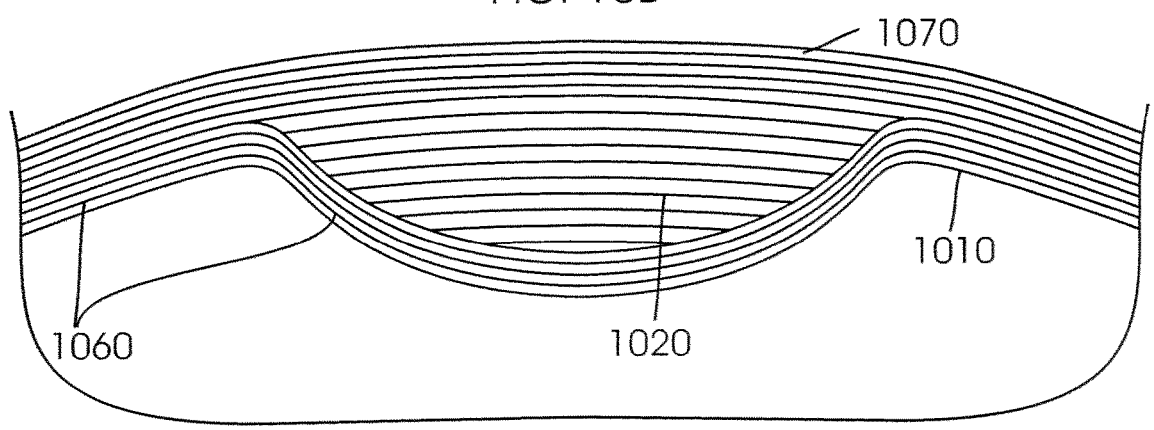
Figure 10D:
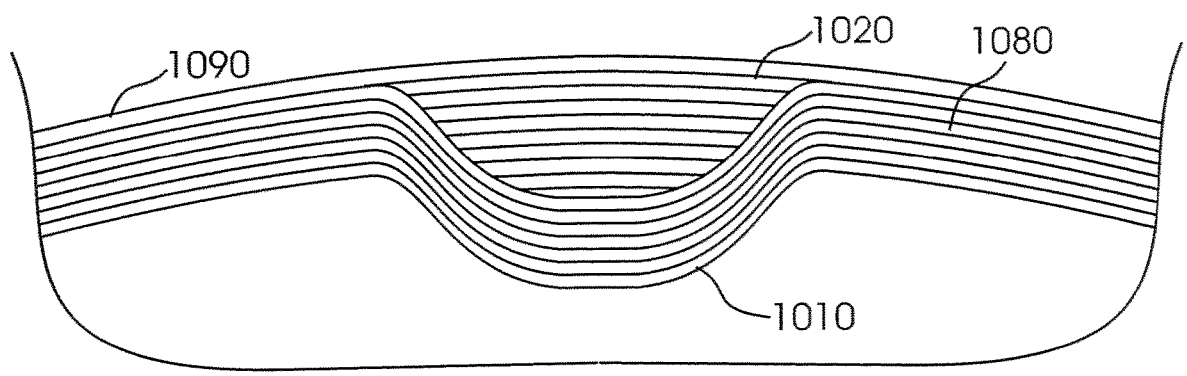

As shown in FIG. 10A, an embodiment has layup 1020 located directly onto mandrel 1020. Then the AFP may apply 1040 over the layup structure 300. Another embodiment shown in FIG. 10B, has at least one ply 1050 applied to mandrel 1010 by AFP prior to locating layup 1020 and then the balance of the plies 1045 applied by AFP. Another embodiment, shown in FIG. 10C, may have a plurality of plies 1060 applied by AFP to mandrel 1010 prior to location of layup 1020 and then the balance of the layers 1070 applied by AFP. Another embodiment, shown in FIG. 10D, has substantially all of the plies 1080 applied to mandrel 1010 by AFP and the layup 1020 applied plies 1080 and then at least on ply 1090 applied by AFP.

As shown in FIG. 10A, mandrel 1010 includes mandrel accommodation 1030 to its outer surface to accommodate layup 1020. Mandrel accommodation 1030 is sized and shaped to couple to the corresponding pre-selected layup 1020. Mandrel accommodation 1030 permits location of layup 1020 on layup structure 300 according to the previously described embodiments resulting in a smooth outer surface without blisters, bulges or protrusions on the outer surface of the completed layup structure 300. The blisters, bulges or protrusions are located on the inner surface of the completed layup structure 300.

Figure 11:
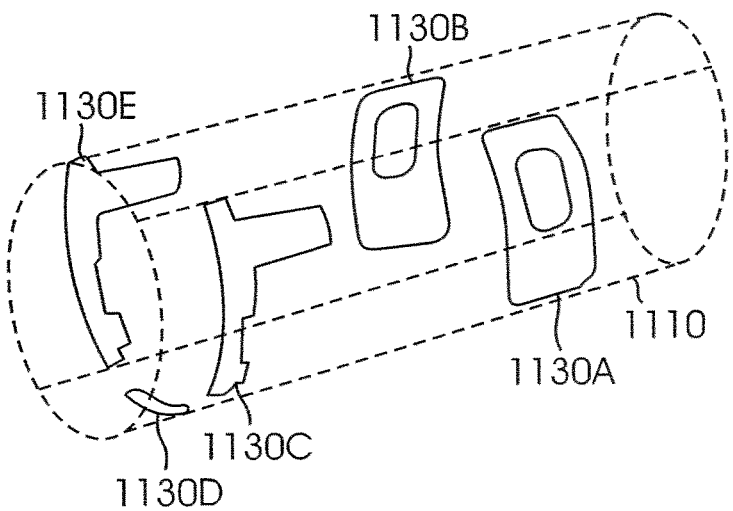
FIG. 11 illustrates multiple layups, which may be applied iteratively to a layup structure, in accordance with the teachings of present disclosure.

Mandrel accommodation 1030 may be located and/or oriented in any suitable fashion to couple with its corresponding pre-selected layup 1020. An embodiment as shown in FIG. 11, has five mandrel accommodations 1130 (*a-e*) located on mandrel 1110.

Embodiments described above illustrate but do not limit the disclosure. It should also be understood that numerous modifications and variations are possible in accordance with the principles of the present disclosure. Accordingly, the scope of the disclosure is defined only by the following claims.

We claim:

1. An apparatus for layup placement on a layup structure, comprising:
   a registration frame having a longitudinal axis;
   a saddle module engaged with the registration frame and comprising a locator arm having a single end pivotably mounted to a saddle base of the saddle module, where the locator arm is configured to pivot in a plane transverse to the longitudinal axis of the registration frame, wherein the saddle module is movable to selectable registration positions along the longitudinal axis of the registration frame and configured to receive a pre-selected composite material layup, wherein the saddle module is configured to place the pre-selected composite material layup on the layup structure; and wherein the saddle module further comprises:
a support frame tensionably attached to the locator arm and configured to flexibly and releasably retain the pre-selected composite material layup; and
a predefined application force applicable by the locator arm and configured to bring the pre-selected composite material layup into forced contact with at least one pre-selected indexed position on the layup structure.

2. The apparatus of claim 1, wherein the saddle module is configured to place the pre-selected composite material layup on the layup structure over a predefined application path using a predefined application force.

3. The apparatus of claim 1, wherein the saddle module is configured to receive a layup kit comprising:
a carrier and the pre-selected composite material layup positioned on the carrier.

4. The apparatus of claim 3, wherein the carrier includes an indexing element configured to retain the pre-selected composite material layup on the saddle module in a selectable indexed orientation corresponding to a pre-selected indexed position on the layup structure.

5. The apparatus of claim 1, wherein the layup structure has a layup structure centerline generally corresponding to a layup structure reference axis, wherein a predefined application path corresponds to a pre-selected registration position along the layup structure reference axis, and the predefined application path at the pre-selected registration position corresponds to a respective layup structure contour profile.

6. The apparatus of claim 1, further comprising a predetermined application force applicable by the saddle module in a predetermined application force direction normal to the locator arm.

7. The apparatus of claim 6, wherein the predetermined application force is applied at a predetermined application rate.

8. The apparatus of claim 1, further comprising:
a fiducial base affixed to a predefined fiducial location in a predefined spatial reference system, wherein the predefined fiducial location demarcates a defined workspace in the predefined spatial reference system; and
the registration frame attached to and in alignment with a longitudinal axis of the fiducial base, wherein the saddle module is engaged with the registration frame at a pre-selected registration position corresponding to the predefined fiducial location, and a predefined application path corresponds to the pre-selected registration position,
wherein the saddle module is configured to place the pre-selected composite material layup on the layup structure over the predefined application path using a predefined application force applied in a predetermined application force direction, and the layup structure has a respective layup structure contour profile corresponding to the pre-selected registration position.

9. The apparatus of claim 1, wherein the layup structure is for an aircraft assembled by a production process, comprising:
a pre-production phase;
a production phase; and
a post production phase.

10. The apparatus of claim 9, wherein the pre-production phase comprises:
selecting a component fabricated by a third party and the component is used in an aircraft assembly and an aircraft sub-assembly.

11. The apparatus of claim 9, wherein the pre-production phase comprises:
designing the layup structure for the layup placement.

12. The apparatus of claim 9, wherein the post production phase comprises:
rework of an aircraft using the pre-selected composite material layup for the layup structure.

13. An apparatus for layup placement on a layup structure, comprising:
a registration frame having a longitudinal axis;
a plurality of saddle modules configured to operate in unison, where at least one saddle module of the plurality of saddle modules is engaged with the registration frame and movable to selectable registration positions along the longitudinal axis of the registration frame; and
the at least one saddle module of the plurality of saddle modules comprises an articulated locator including at least one locator arm having a single end pivotably mounted to a saddle base of the saddle module and pivotable in a plane transverse to the longitudinal axis of the registration frame;
wherein the plurality of saddle modules is configured to receive a pre-selected composite material layup and to place the pre-selected composite material layup on the layup structure; and
wherein the at least one saddle module further comprises:
a support frame tensionably attached to the locator arm and configured to flexibly and releasably retain the pre-selected composite material layup; and
a predefined application force applicable by the locator arm and configured to bring the pre-selected composite material layup into forced contact with at least one pre-selected indexed position on the layup structure.

14. The apparatus of claim 13, further comprising a predefined application force applicable by the plurality of saddle modules and configured to place the pre-selected composite material layup on the layup structure.

15. The apparatus of claim 14, wherein the predefined application force is applied over a predefined application path corresponding to a layup structure contour profile.

16. The apparatus of claim 14, wherein the plurality of saddle modules is configured to receive a layup kit comprising a carrier and the pre-selected composite material layup positioned on the carrier, wherein the carrier includes an indexing element configured to retain the pre-selected composite material layup on the plurality of saddle modules in a selectable indexed orientation corresponding to a pre-selected indexed position on the layup structure.

17. The apparatus of claim 13, wherein the layup structure is for an aircraft assembled by a production process, comprising:
a pre-production phase;
a production phase; and
a post production phase.

18. The apparatus of claim 17, wherein the pre-production phase comprises:
selecting a component fabricated by a third party and the component is used in an aircraft assembly and an aircraft sub-assembly.

19. The apparatus of claim 17, wherein the pre-production phase comprises:
designing the layup structure for the layup placement.

20. The apparatus of claim 17, wherein the post production phase, comprises:
rework of an aircraft using the pre-selected composite material layup for the layup structure.

* * * * *